(12) United States Patent
Ai et al.

(10) Patent No.: US 7,457,432 B2
(45) Date of Patent: Nov. 25, 2008

(54) SPECIFIED OBJECT DETECTION APPARATUS

(75) Inventors: Haizhou Ai, Beijing (CN); Chang Huang, Beijing (CN); Bo Wu, Beijing (CN); Shihong Lao, Kyoto (JP)

(73) Assignees: OMRON Corporation, Kyoto (JP); Tsinghua University, Beijing (CN)

( * ) Notice: Subject to any disclaimer, the term of this patent is extended or adjusted under 35 U.S.C. 154(b) by 804 days.

(21) Appl. No.: 11/003,004

(22) Filed: Dec. 2, 2004

(65) Prior Publication Data

US 2005/0271245 A1 Dec. 8, 2005

(30) Foreign Application Priority Data

May 14, 2004 (CN) ...................... 2004 1 00381936

(51) Int. Cl.
*G06K 9/00* (2006.01)
*A61B 1/04* (2006.01)
(52) U.S. Cl. .................... 382/103; 348/169; 382/118
(58) Field of Classification Search ................. 382/100, 382/103, 118, 181, 190, 209, 218, 224; 348/169
See application file for complete search history.

(56) References Cited

U.S. PATENT DOCUMENTS

| | | | | |
|---|---|---|---|---|
| 5,135,303 | A * | 8/1992 | Uto et al. ................. | 356/237.2 |
| 6,111,982 | A * | 8/2000 | Adachi ....................... | 382/176 |
| 6,542,625 | B1 * | 4/2003 | Lee et al. ................... | 382/118 |
| 6,829,384 | B2 * | 12/2004 | Schneiderman et al. ..... | 382/154 |
| 2005/0105827 | A1 * | 5/2005 | Yonaha et al. .............. | 382/291 |
| 2005/0139782 | A1 * | 6/2005 | Nagahashi et al. ........ | 250/459.1 |
| 2005/0141766 | A1 * | 6/2005 | Nagahashi et al. .......... | 382/190 |

FOREIGN PATENT DOCUMENTS

JP 2000-123148 4/2000

OTHER PUBLICATIONS

European Search Report for European Application No. EP 04 10 6272 mailed on Jun. 24, 2005, 3 pages.
Bo Wu, et al., "LUT-based Adaboost for Gender Classification," Audio- and Video-based Biometric Person Authentication. 4th International Conference, AVBPA 2003. Proceedings (Lecture Notes in Computer Science vol. 2688) Springer-Verlag Berlin, Germany, 2003, pp. 104-110, XP002331523, ISBN: 3-540-40302-7.
Viola P., et al., "Rapid Object Detection Using A Boosted Cascade of Simple Features," Proceedings 2001 IEEE Conference on Computer Vision and Pattern Recognition. CVPR 2001. Kauai, Hawaii, Dec. 8-14, 2001, Proceedings of the IEEE Computer Conference on Computer Vision and Pattern Recognition, Los Alamitos, CA, IEEE Comp. Soc., US, vol. 1 of 2, Dec. 8, 2001, pp. 511-518, XP010583787, ISBN: 0-7695-1272-0.

(Continued)

*Primary Examiner*—Daniel G Mariam
(74) *Attorney, Agent, or Firm*—Osha•Liang LLP

(57) ABSTRACT

Unlike in the prior art in which the correspondence between a feature and a judgment value in an intended area is obtained by a single threshold value, the correspondence of the judgment value is obtained independently for each feature by use of a look-up table or the like. This makes it possible to achieve an accurate correspondence between the judgment value and the feature and thus to improve the high processing accuracy. Also, in the prior art, the judgment is repeated several times to secure the accuracy of the judgment and based on the total result thereof, the final judgment is made. Since the accuracy of each process is improved, however, the number of times the judgment is repeated is reduced for a higher processing speed.

14 Claims, 18 Drawing Sheets

OTHER PUBLICATIONS

Chang Huang, et al., "Boosting Nested Cascade Detector for Multi-View Face Detection," Pattern Recognition, 2004. ICPR 2004. Proceedings of the 17th International Conference on Cambridge, UK, Aug. 23-26, 2004, Piscataway, NJ, USA, IEEE, vol. 2, Aug. 23, 2004, pp. 415-418, XP010724372, ISBN: 0-7695-2128-2.

Fleuret F. et al., "Fast Face Detection with Precise Pose Estimation," Proceedings 16th International Conference on Pattern Recognition IEEE Comput. Soc. Los Alamitos, CA, USA, vol. 1, 2002, pp. 235-238, vol. 1, XP002331524, ISBN: 0-7695-1695-X *abstract; figures 2, 3* p. 236, left-hand column, paragraph 4—p. 237, left-hand column, paragraph 3*.

Rowley H. A. et al., "Neural Network-Based Face Detection," Proceedings of The 1996 IEEE Computer Society Conference on Computer Vision and Pattern Recognition. San Francisco, Jun. 18-20, 1996, Proceedings of The IEEE Computer Society Conference on Computer Vision and Pattern Recognition, Los Alamitos, IEEE, Jun. 18, 1996, pp. 203-208, XP000640242, ISBN: 0-8186-7258-7 *p. 203, right-hand column, paragraph 3*.

Viola P., et al., "Robust Real-Time Object Detection", Abstract, Second International Workshop on Statistical and Computational Theories of Vision-Modeling, Learning, Computing, and Sampling, Jul. 13, 2001, 25 pages, Vancouver, Canada.

Patent Abstracts of Japan, Publication No. 2000-123148, Publication Date Apr. 28, 2000, 2 pages.

* cited by examiner

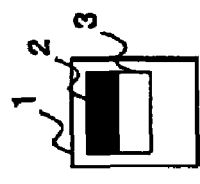
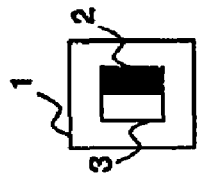
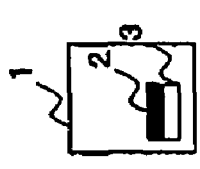
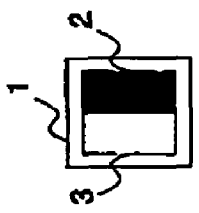
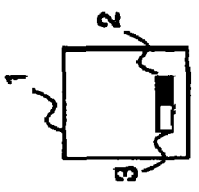
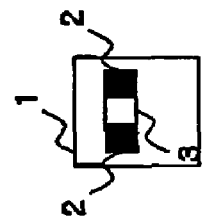
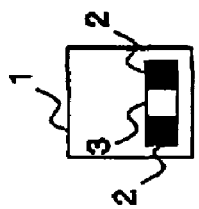
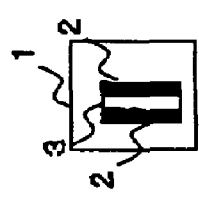
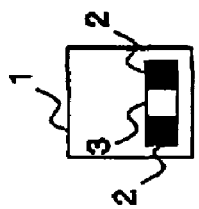
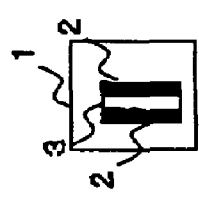
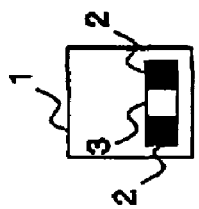

Fig. 5

Fig. 10

| Differential value | ... | 40~60 | 60~80 | 80~100 | 100~120 | 120~140 | 140~160 | ... |
|---|---|---|---|---|---|---|---|---|
| Judgment value | ... | 0 | 1 | 1 | 0 | 1 | 0 | ... |

| Differential value | ... | 40~60 | 60~80 | 80~100 | 100~120 | 120~140 | 140~160 | ... |
|---|---|---|---|---|---|---|---|---|
| Judgment value | ... | 0.6 | 0.9 | 0.7 | 0.2 | 0.1 | 0.8 | ... |

19b

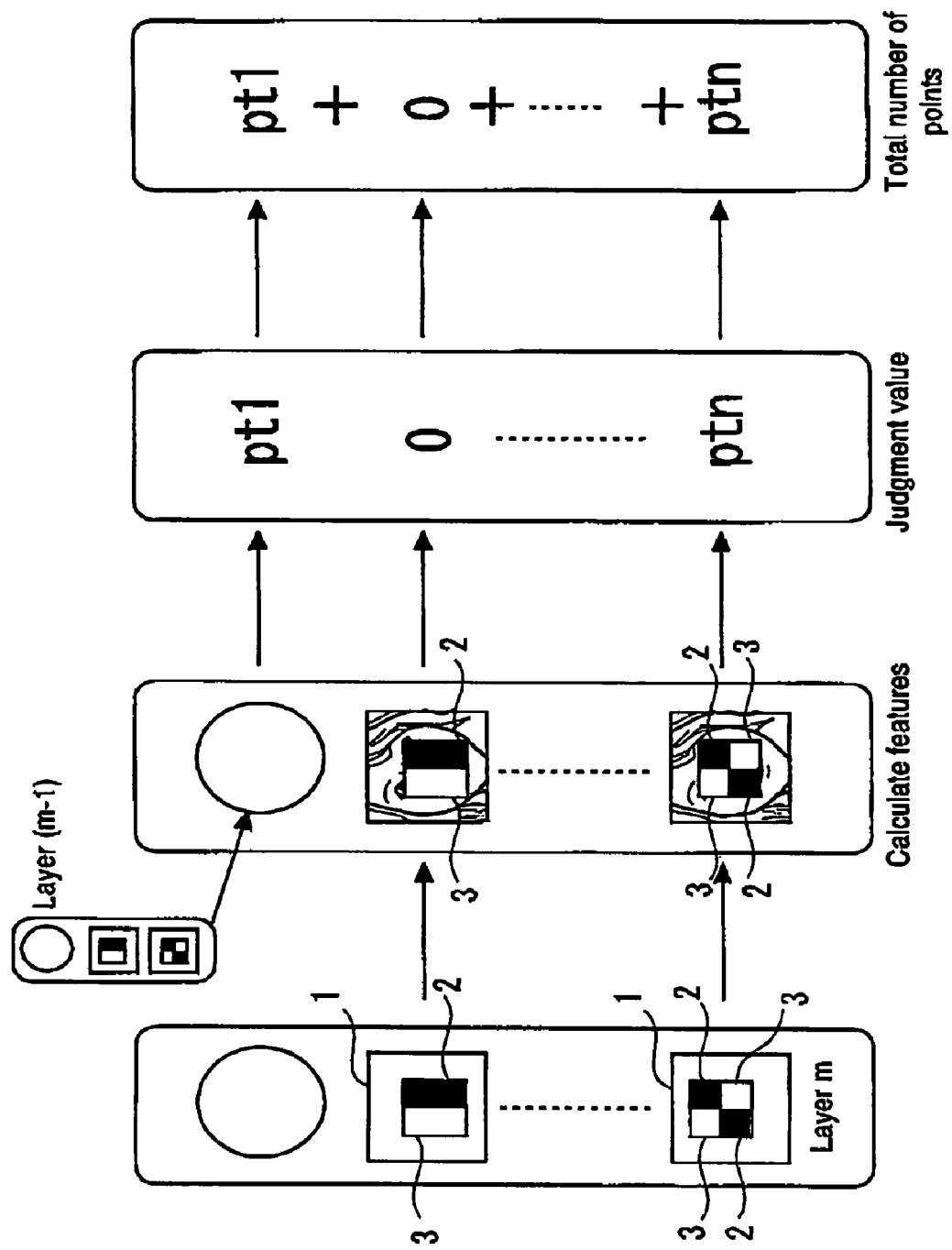

SPECIFIED OBJECT DETECTION APPARATUS

BACKGROUND OF THE INVENTION

1. Field of the Invention

The present invention relates to a technique effectively applicable to an apparatus and a method for detecting from a picked-up image a specified object or a part of the object such as a man, an animal or any other physical object included in the particular image.

2. Description of the Background Art

A conventional technique is available for detecting a specified object or a part of the object such as a man, an animal or any other physical object included in a picked-up image. An example of this conventional technique is to detect a human face from a picked-up image (See Paul Viola, Michael Jones, "Robust Real-Time Object Detection" SECOND INTERNATIONAL WORKSHOP ON STATISTICAL AND COMPUTATIONAL THEORIES OF VISION-MODELING, LEARNING, COMPUTING, AND SAMPLING VANCOUVER, CANADA, Jul. 13, 2001 (hereinafter referred to as Non-patent Reference 1)).

In Non-patent Reference 1, a specified rectangle (hereinafter referred to as "the face judging rectangle") to be processed is moved in an image thereby to judge whether a human face is included in the face judging rectangle of each destination (hereinafter referred to as "the intended area"). FIG. 14 is a diagram showing an example of the face judging rectangle (face judging rectangle P1). With reference to FIG. 14, the process of detecting a human face using the face judging rectangle P1 is explained.

The face judging rectangle P1 includes therein a plurality of other rectangles (hereinafter referred to as "the first rectangle", "the second rectangle") P2, P3. The first rectangle P2 and the second rectangle P3 are arranged at predetermined positions in the face judging rectangle P1. At least one first rectangle P2 and at least one second rectangle P3 are arranged in one face judging rectangle P1.

In the face detecting process, the feature of each area defined by the first rectangle P2 and the second rectangle P3 (hereinafter referred to as "the first feature area" and "the second feature area") in each intended area is calculated. The feature of the first feature area or the second feature area indicates, for example, an average pixel value in the respective area.

Next, the difference between the feature La of the first feature area and the feature Lb of the second feature area is calculated. In accordance with whether this differential value is larger or not than a preset threshold value $\alpha$, it is judged whether a human face is included in the intended area or not. The threshold value $\alpha$ is determined by learning using a sample image.

In the actual process, a plurality of patterns of the face judging rectangle are prepared, and the judgment is made for each pattern. Each pattern has a different number or position of the first rectangles P2 or the second rectangles P3. Based on each judgment result, it is finally judged whether the intended area includes a human face or not.

The aforementioned technique for detecting a human face by calculating the difference of the feature between the first feature area and the second feature area as described above is also disclosed in Japanese Unexamined Patent Publication No. 2000-123148 (Patent Reference 1).

The accuracy of detecting a human face in an image has been improved by employing a method using the face judging rectangle P1 as described above. Currently, however, the process of detecting a human face in an image is required to be executed in real time on a device such as a portable telephone having a machine specification not comparatively highly sophisticated. Therefore, an improved processing speed is also required. At the same time, the accuracy of human face detection in an image is still required.

SUMMARY OF THE INVENTION

The object of this invention is to solve this problem and provide a device for realizing a high speed and a high accuracy of the process of judging whether a human face is included in a given intended area in an image.

[First Aspect]

In order to solve this problem, according to a first aspect of the invention, there is provided a specified object detection apparatus comprising a storage part, a calculation part and a judging part.

The storage part is for storing various judgment values prepared for a plurality of features, respectively. The judgment value is defined as a value used for the judging process in the judging part. The judgment value indicates, for example, whether the possibility that a specified object is included in an intended area is high or not in the case where a corresponding feature is calculated by the calculation part.

The calculation part is for calculating a feature in the intended area. The intended area is defined as an area in which it is judged whether a specified object is included or not. In other words, the intended area is defined as an area constituting an area to be processed by a specified object detection apparatus. Also, the feature is a value uniquely determined from the state of the pixels included in the intended area, such as the average value, the total value or the distribution of all or a part of the pixels in the intended area.

The judging part is for judging whether a specified object is included in an intended area or not, based on a judgment value stored in the storage part and corresponding to the feature calculated by the calculation part. In the case where a judgment value corresponding to a calculated feature indicates a high possibility that a specified object is included in the intended area, for example, the judging part judges that a specified object is included in the intended area.

In the first aspect of the invention having this configuration, the judgment value used for the judging process of the judging part is stored in the storage part as a value corresponding to each feature. Unlike in the case where a feature and a judgment value are matched with each other by a single threshold value as in the prior art, therefore, the judgment value and the feature can be matched with each other with a higher accuracy. Thus, the judging part can judge more accurately whether a specified object is included in an intended area or not for each given feature.

This first aspect of the invention can be modified as follows. Specifically, according to a modified first aspect of the invention, there is provided a specified object detection apparatus comprising a part for accessing the area pattern information for defining a partial area of an image, a calculation part for calculating a feature of the image by executing a prejudged calculation in accordance with the area pattern information, a judgment value storage part for storing a feature calculated for each of a plurality of sample images, combined with a judgment value for an attribute of an image of which the feature is calculated, and a judging part for Judging whether the particular image has the particular attribute, based on the feature calculated for the particular image.

In this modified first aspect of the invention, the feature calculated for each of a plurality of sample values and a judgment value for an attribute of an image of which the particular feature has been calculated are stored in combination. For example, the feature calculated for a sample image having an attribute (existence of a specified object, etc.) and the judgment value indicating the existence of the particular attribute are stored. On the other hand, the feature calculated for a sample image not having the particular attribute (existence of a specified object, etc.) and the judgment value indicating the nonexistence of the attribute thereof are stored.

A set of a feature and a corresponding judgment value for each of a plurality of sample images is stored in advance in the judgment value storage part. As an alternative, the frequency distribution of a feature is judged for each of a plurality of sample images, and a judgment value indicating the existence of an attribute (existence of a specified object, etc.) is stored for a feature range in which the frequency for a sample image having the particular attribute is not lower than a predetermined value. On the other hand, a judgment value indicating the nonexistence of an attribute (existence of a specified object, etc.) is stored for a feature range in which the frequency for the sample images not having the particular attribute is not lower than a predetermined value.

[Second Aspect]

According to a second aspect of the invention, there is provided a specified object detection apparatus comprising a storage part, a calculation part, a first judging part, a control part and a second judging part.

The storage part is for storing various judgment values corresponding to a plurality of features, respectively. The judgment values stored in the storage part may be binary (for example, "0" or "1") or in real number. In the case where the judgment value is given as a real number, as compared with a binary number, the accuracy of the judging process in the first judging part and the second judging part is improved.

The calculation part for calculating the features in the same intended area by a plurality of different calculation processes. The plurality of different calculation processes may use different types of the values calculated (for example, the average, the total and the distribution) or different inputs for executing the calculation process (the data are input for different partial areas in the intended area, for example). Also, different types of the value calculated or different Inputs for the calculation process may be used.

The first judging part calculates the number of points based on the judgment value corresponding to the feature calculated by the calculation part, and based on this number of points, judges whether a specified object is included or not in the intended area. For example, the number of points is calculated by accumulating a plurality of judgment values corresponding to a plurality of calculated features, and in the case where the number of points is a value indicating a high possibility that a specified object is included in the intended area (in the case where a predetermined threshold value is exceeded, for example), the judging part judges that a specified object is included in the intended area.

The control part sets a plurality of features obtained in different calculation processes by the calculation part and applies them to the first judging part thereby to acquire a sufficient number of judgment results for final judgment from the first judging part. The first judging part, therefore, reads from the storage part the judgment values corresponding to a plurality of features included in the set received from the control part, calculates the number of points from these judgment values, and judges whether a specified object is included in the intended area or not. As a result, the first judging part produces a plurality of judgment results. Each judgment result is not necessarily the same.

Also, either the control part may judge dynamically whether the number of the judgment results obtained is sufficient for the final judgment or not, or the number may be determined in advance. For example, the number of the judgment results sufficient for final judgment may be set in advance by execution of the learning algorithm or based on the empirical sense of the manager. The calculation process executed by the calculation part, as well as the number of the judgment results, may be set in advance.

The higher the accuracy of the final judgment, i.e. the judgment by the second judging part, the larger the number of the judgment results of the first judging part. For this reason, the number sufficient for final judgment is defined as the number required to secure a predetermined accuracy of the final judgment.

The second judging part makes the final judgment as to whether a specified object is included in an intended area, based on a plurality of judgment results of the first judging part acquired by the control part.

In the second aspect of the invention having this configuration, the judgment value used for the judging process of the first judging part is stored in the storage part as a value corresponding to each feature. Unlike in the prior art where a feature and a judgment value are matched with each other by a single threshold value, therefore, a judgment value and a feature can be matched with each other more accurately. Thus, the accuracy of the judgment value is improved, and so is the result of the process executed by the first judging part using the particular judgment value. In other words, the first judging part can more accurately judge, based on a given feature, as to whether a specified object is included in an intended area or not.

As the result of an improved accuracy of each judgment value, the accuracy of the processing result can be maintained even in the case where the number of the features applied as a set to the first judging part, i.e. the number of judgment values used by the first judging part is reduced. As a result, the processing speed can be increased by reducing the number of features applied as a set while at the same time maintaining the accuracy of the processing result of the first judging part.

Also, as the result of an improved accuracy of the judgment result of the first judging part, the accuracy of the final judgment (the accuracy of the judgment of the second judging part) can be secured even in the case where the number of the judgment results of the first judging part is reduced. Specifically, the number of judgment results sufficient for the final judgment is reduced, and so is the number of times the judging process is executed by the first judging part As a result, a lesser time length is required before finally judging whether a specified object is included in an intended area or not. In this way, the process of detecting a specified object can be executed more quickly without sacrificing the accuracy.

In the second aspect of the invention, the first judging part may be so configured that a plurality of features are received from the control part as a new set and a new number of points is calculated using a plurality of judgment values for each of a plurality of features constituting the new set and the number of points calculated for the set on which the judging process has been completely executed by the first judging part.

In this configuration, the judging process in the first judging part is affected not only by the judgment values of the features included in the particular set but also by the judgment values of other sets (the sets on which the judging process has been completely executed by the first judging part). This improves the accuracy of the process in the first judging part. With the improvement of accuracy in the first judging part, the accuracy of the final judgment can be secured even in the case where the number of judgment results of the first judging part is reduced. Specifically, the number of the judgment results sufficient to secure the final judgment is reduced, and so is the number of times the judging process is executed by the first judging part. As a result, the time required before the final judgment as to whether a specified object is included in an intended area or not is shortened. In this way, the process of detecting a specified object can be executed more quickly without adversely affecting the accuracy.

[Third Aspect]

According to a third aspect of the invention, there is provided a specified object detection apparatus comprising a storage part, a calculation part, a first judging part, a control part and a second judging part.

The storage part stores each judgment value corresponding to each of a plurality of features for each of a plurality of different patterns. Once a pattern and a feature are obtained, therefore, the judgment value is uniquely determined.

The calculation part calculates the features in the same intended area of an image based on each of a plurality of different patterns.

The first judging part produces a judgment value corresponding to the feature calculated by the calculation part and the pattern used by the calculation part. Based on the judgment value thus obtained, the number of points is calculated, and based on this number of points, the first judging part judges whether a specified object is included or not in the intended area.

The control part acquires from the first judging part the judgment results in the number sufficient to obtain the final judgment by applying a plurality of features as a set to the first judging part. A plurality of the features are obtained by the calculation process based on a plurality of different patterns. Specifically, the features for each pattern are calculated by the calculation part. A set of the features obtained for each pattern is applied to the first judging part, and the judgment result of the first judging part is obtained.

The second judging part, based on a plurality of judgment results of the first judging part acquired by the control part, finally judges whether a specified object is included in an intended area or not.

In the third aspect of the invention having the aforementioned configuration, the judgment values used for the judging process of the first judging part are stored in the storage part as values corresponding to each feature for each pattern. Unlike the prior art in which the feature and the judgment value are matched with each other by a single threshold value, therefore, the invention makes it possible to match the judgment value and the feature with each other more accurately. Thus, the accuracy of each judgment value is improved, and so is the accuracy of the result of the process executed by the first judging part using the particular judgment value. In other words, the first judging part can more accurately judge whether a specified object is included in an intended area or not, based on the features given for each pattern.

Also, due to the improved accuracy of each judgment value, the accuracy of the processing result can be maintained even in the case where the number of features applied as a set to the first judging part, i.e. the number of the judgment values used in the first judging part is reduced. As a result, the resulting reduced number of features applied as a set increases the processing speed while at the same time maintaining the accuracy of the processing result in the first judging part.

Also, the improved accuracy of the judgment result in the first judging part can secure the accuracy of the final judgment (the judgment accuracy of the second judging part) even with a reduced number of the judgment results of the first judging part. Specifically, even in the case where the number of the patterns used in the calculation part and the first judgment part is reduced, the accuracy of the final judgment can be secured. In other words, the number of the judgment results sufficient to obtain the final judgment is reduced, and so is the number of times the judgment process is executed by the first judging part. As a result, the time required to finally judge whether a specified object is included or not in an intended area is shortened. In this way, the process of detecting a specified object can be executed at higher speed without adversely affecting the accuracy.

The storage part in the third aspect of the invention may store the features divided into a plurality of sections and the judgment value for each section in correspondence with each other.

Also, in the third aspect of the invention, the judgment value of each section may be determined by a criterion generating device described below. The criterion generating device includes a sample image feature calculation part, a frequency acquisition part and a judgment value determining part.

The sample image feature calculation part calculates the feature of each of a plurality of sample images based on an arbitrary pattern. The frequency acquisition part determines the frequency of the sample image at which the feature calculated by the sample image feature calculation part is included in each section of a plurality of features. The judgment value determining part, based on the frequency in each of a plurality of sections, judges the advisability of judging whether a specified object is included in an intended area for which the feature calculated based on the frequency pattern is included the particular section thereby to determine the judgment value.

In the third aspect of the invention, the sample image may be configured to include a success image including a specified object to be processed for judgment by the first judging part and a failure image not including a specified object.

Also, in the third aspect of the invention, the judgment value for each section may be set based on the relative values of the index of each of the success image and the failure image.

Further, in the third aspect of the invention, the judgment value for each section may be set based on the relative values of the frequency of each of the success image and the failure image. The relative values include the ratio, the difference, etc.

The pattern in the third aspect of the invention includes a first feature area and a second feature area, and the position and the size of each feature area are fixed in a specified area for each pattern.

The calculation part according to the third aspect of the invention may be configured to calculate the feature in an intended area by calculating the relative values of the first feature in the first feature area and the second feature in the second feature area in the intended area. The relative values are the ratio, the difference, etc.

The first judging part according to the third aspect of the invention may be so configured that a plurality of features are received as a new set from the control part and a new number of points is calculated using a plurality of judgment values for each of a plurality of features constituting the new set and the number of points calculated in the set on which the judgment process has been completely executed by the first judging part.

With this configuration, the third aspect of the invention has a similar effect to the second aspect thereof having a similar configuration.

[Fourth Aspect]

According to a fourth aspect of the invention, there is provided a criterion generating device comprising a calculation part, a frequency acquisition part, a judgment part and a criterion generating part.

The calculation part calculates the feature of each of a plurality of sample images based on an arbitrary pattern.

The frequency acquisition part determines the frequency of the sample images at which the feature calculated by the calculation part is included in each of a plurality of sections into which the feature is divided. The frequency is indicative of, for example, the number of sample images or the product of the number of samples and the weight set for each sample image.

The judging part determines the judgment value for each section of the feature based on the frequency for the particular section. The judging part determines the judgment value by judging the advisability of judging whether a specified object is included in an intended area included in an arbitrary section which includes the feature calculated based on the pattern. In the case where the feature calculated based on a given pattern is associated with a given section, for example, the judgment value is determined by judging whether the possibility is high or not that a specified object is included in the intended area.

The criterion generating part generates a criterion for matching each section and a judgment value, based on the judgment result of the judging part. A table of correspondence between each section and a judgment value is a specific example of the criterion.

In the fourth aspect of the invention having this configuration, a table having a judgment value corresponding to each section of the feature is generated. Unlike in the case where the feature and the judgment value are matched with each other by a single threshold value as in the prior art, therefore, a more accurate correspondence table of the feature and the judgment value can be generated. In the case where the process for detecting a specified object is executed using this table, therefore, it can be judged more accurately whether a specified object is included in an intended area or not.

[Others]

The first to fourth aspects of the invention may be implemented by an information processing system executing a program. Specifically, the operation and the effects described above may be realized either with a program for causing the information processing system to execute the process executed by each part in the first to fourth aspects of the invention or a recording medium for recording the particular program. As an alternative, the operation and the effects described above may be realized by a method in which the process executed by each part in the first to fourth aspects of the invention is executed by the information processing system.

According to this invention, the judgment values used for the judgment process executed by the judging part are each stored with a corresponding feature in the storage part. Thus, the correspondence between the judgment value and the feature can be accomplished more accurately than in the conventional case where the feature and the judgment value are matched with each other by a single threshold value. Thus, the judging part can more accurately judge whether a specified object is included in an intended area for each of given features.

Also, in the case where a more in-depth judgment is made based on a plurality of judgment results to secure the accuracy of the final judgment, the accuracy of the judgment result using the judgment value is improved. Even in the case where the number of the judgment results using this judgment value, therefore, the accuracy of the final judgment can be secured. As a result, the time required to make the final judgment as to whether a specified object is included or not in an intended area is shortened. In this way, the process for detecting a specified object can be executed more quickly without adversely affecting the accuracy.

BRIEF DESCRIPTION OF THE DRAWINGS

FIG. 1 shows an example of a pattern of a face rectangle.

FIG. 5 shows a method of selecting an intended area with the size of a human image fixed.

FIG. 10 shows an example of the LUT (look-up table) according to the first embodiment.

FIG. 16 shows an example of the LUT according to the second embodiment.

FIG. 18 shows a specific example of the process in each layer according to the second embodiment.

DESCRIPTION OF THE PREFERRED EMBODIMENTS

Figure 2:
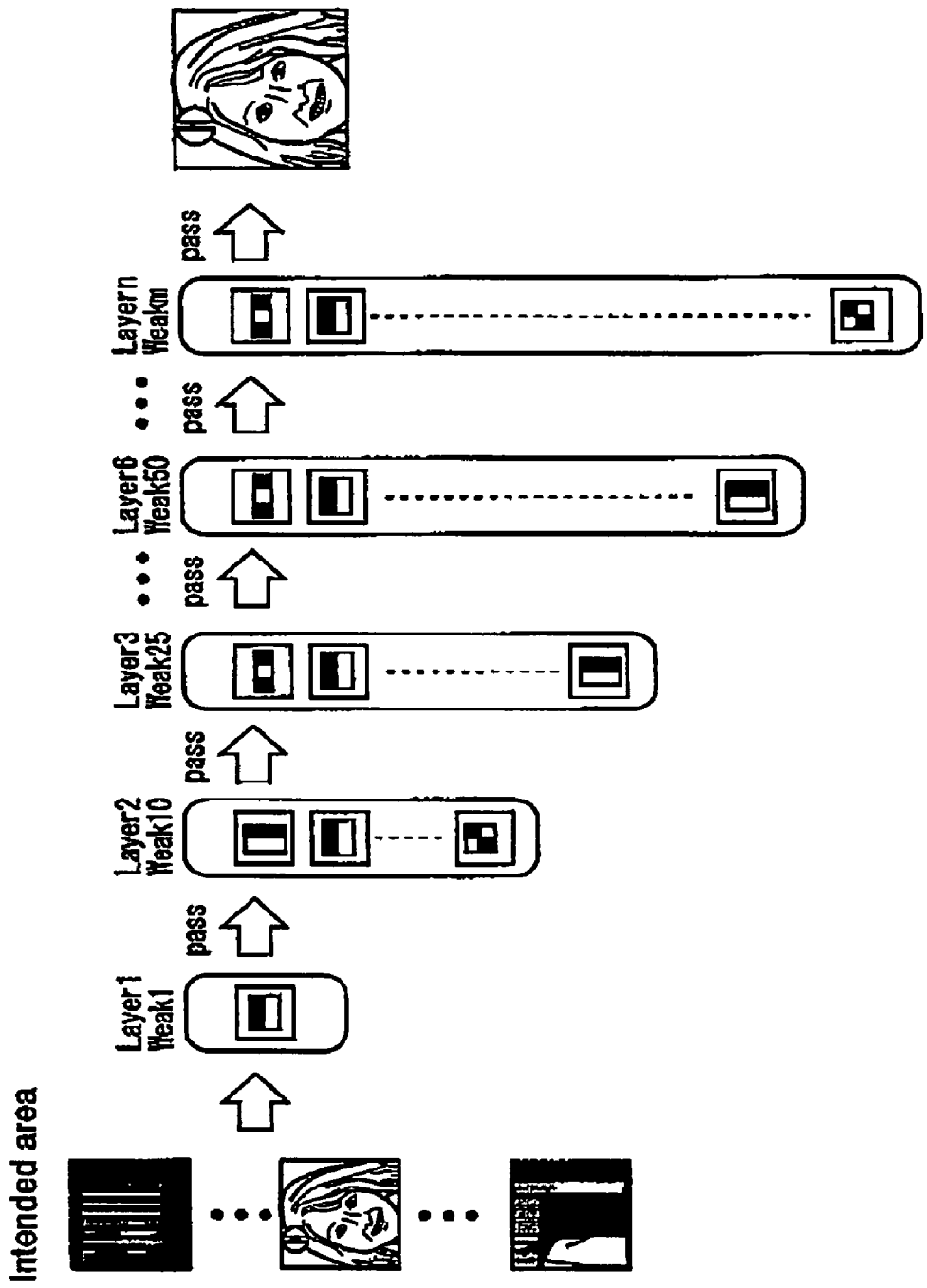
FIG. 2 shows the process flow for face detection.

A specified object detection apparatus according to an embodiment of this invention is explained below with reference to the drawings. In the description that follows, a face detection device 4 (including 4a, 4b) (FIG. 11) for detecting a human face from a human image is taken as a specific example of the specified object detection apparatus.

In this explanation, the human image is defined as an image containing at least a part or the whole of the human face. The human image, therefore, may contain the whole body of a man or only the face or an upper half of the body of a man. The human image, on the other hand, may include images of a plurality of men. Further, the human image may contain, on the background thereof, any pattern such as a landscape (including an intended object) other than the man.

The face detection device 4 described below is only illustrative and the configuration thereof is not limited to the one described below.

[Principle of Face Detection]

First, the principle of the face detection technique used with the face detection device 4 is explained. The face detection technique used with the face detection device 4 has several different points from the conventional face detection technique. The principle of the conventional face detection technique is explained first. In the conventional face detection technique, the learning is executed using a sample image in advance (hereinafter referred to as "the learning process"), and the face is detected based on the learning result (hereafter referred to as "the face detection process").

[Learning Process]

First, the conventional learning process using sample images is explained. A plurality of face images (success images) and non-race images (failure images) equal in size are prepared as sample images. In the case under consideration, a plurality of rectangular images having the same number of vertical and horizontal pixels are used as sample images. The face image is defined as an image containing a human face, and framed or trimmed in accordance with the size of the human face. The non-face image is an image not containing a human face and configured of an image of, for example a landscape or an animal other than the man. In the face detection device 4, the aforementioned face image is prepared as a success image to detect a human face as a specified object. In similar fashion, the aforementioned non-face image is prepared as a failure image. In other specific examples of a specified object detection apparatus, an image containing a specified object to be detected is prepared as a success image, and an image not containing a specified object as a failure image.

The learning process uses a rectangle defining an area of the same size as a sample image (hereinafter referred to as "the face rectangle"). FIG. 1 is a diagram showing examples of the face rectangle. Each face rectangle 1 includes at least a first rectangle 2 and at least a second rectangle 3. The face rectangle 1 has a plurality of patterns in accordance with to the number and positions of the first rectangles 2 and the second rectangles 3 (A to L in FIG. 1). Specifically, each face rectangle 1 has an inherent number and arrangement of the first rectangles 2 and the second rectangles 3 as a pattern. The learning using the face rectangle 1 and sample images is explained below.

First, the data on a pattern of the face rectangle 1 are collected using all sample images. First in the data collecting process, the feature (for example, the average value of the pixels in the area) of each of the areas corresponding to the first rectangle 2 and the second rectangle 3 (hereinafter referred to as "the first feature area" and "the second feature area", respectively) in the sample image are calculated. In the case where a plurality of the first feature areas and/or the second feature areas are included in one face rectangle 1, the total value of the features of each of the respective areas is calculated as each feature. In the case of FIG. 1J, for example, the feature of the first feature area is calculated as the sum of the features of the two first feature areas. And a differential value is calculated as a relative value (such as the ratio or the difference, the latter being assumed as a relative value in the case under consideration) between the features of the first and second feature areas. This differential value indicates the feature of an intended area.

Next, a threshold value corresponding to the face rectangle 1 of each pattern is determined based on the calculated differential value (feature of the intended area). This threshold value is determined using a stochastic method. Normally, this stochastic method is designed by assuming a simple arithmetic model (such as the Gauss distribution). For example, the total (integrated value) of the number of samples is determined for each of the face image and the non-face image for the difference of zero to a specified value, and the value associated with the maximum difference of the total is set as a threshold value.

This process is executed for the face rectangle 1 of all the patterns prepared, so that a threshold is set as a value corresponding to each of all the patterns of the face rectangles 1.

Next, of all the patterns of a plurality of the face rectangles 1 for which a threshold value is set, a pattern of the face rectangle 1 to be used in the face detection process is determined. In this specified object detection apparatus, the judgment is carried out on the presence or absence of a face for each unit of processing called the layer. For example, the possibility of existence of a face is roughly judged in layer 1, and in the case where this possibility is zero, the process is stopped. In the case where the possibility of existence of a face is not zero, on the other hand, a more detailed judgment is made in the next layer 2.

At the time of this judgment, the face rectangle 1 of the pattern used in each of a plurality of layers (of which a specific example will be explained with reference to the face detection process) is assigned to each layer in which the presence or absence of the face is judged in the face detection process. This process is executed by the boosting learning algorithm such as AdaBoost.

The number of layers required to execute the face detection process and the number of the face rectangles 1 assigned to each layer are also determined by the designer at the time of the aforementioned judgment. In the process, the larger the number of the face rectangles 1 used for the face detection process, the higher the process accuracy. Therefore, the number of the face rectangles 1 sufficient to obtain the final judgment in the face detection process is determined by the designer based on his/her experiments and experiences. Based on this number, the designer determines the number of layers and the number of the face rectangles 1 assigned to each layer. These numbers are appropriately determined in accordance with the processing rate and accuracy required of the face detection process.

[Face Detection Process]

Next, the conventional face detection process is explained. FIG. 2 is a diagram showing the flow of the face detection process. First, with reference to FIG. 2, the general flow of the face detection process is explained.

The face detection process is executed in a plurality of layers. Each layer is assigned a different set of the face rectangles 1. In FIG. 2, a different layer is assigned a different number of the face rectangles 1. Also, each layer is assigned the order in which the judgment is made, and each layer executes the process in accordance with that order. Specifically, in FIG. 2, the layer 2 executes the judgment following the layer 1, followed by the layer 3.

Each layer judges whether a human face is included in an intended area, using the face rectangle 1 of the pattern assigned to itself in the order of assignment. In the case where a given layer judges that no human face is included in an intended area, for example, the subsequent layers execute no judgment on this intended area. In the case where the last layer (layer n in FIG. 2) judges that a human face is included in the intended area, it is finally judged in the face detection process that a human face is included in the intended area.

Figure 3:
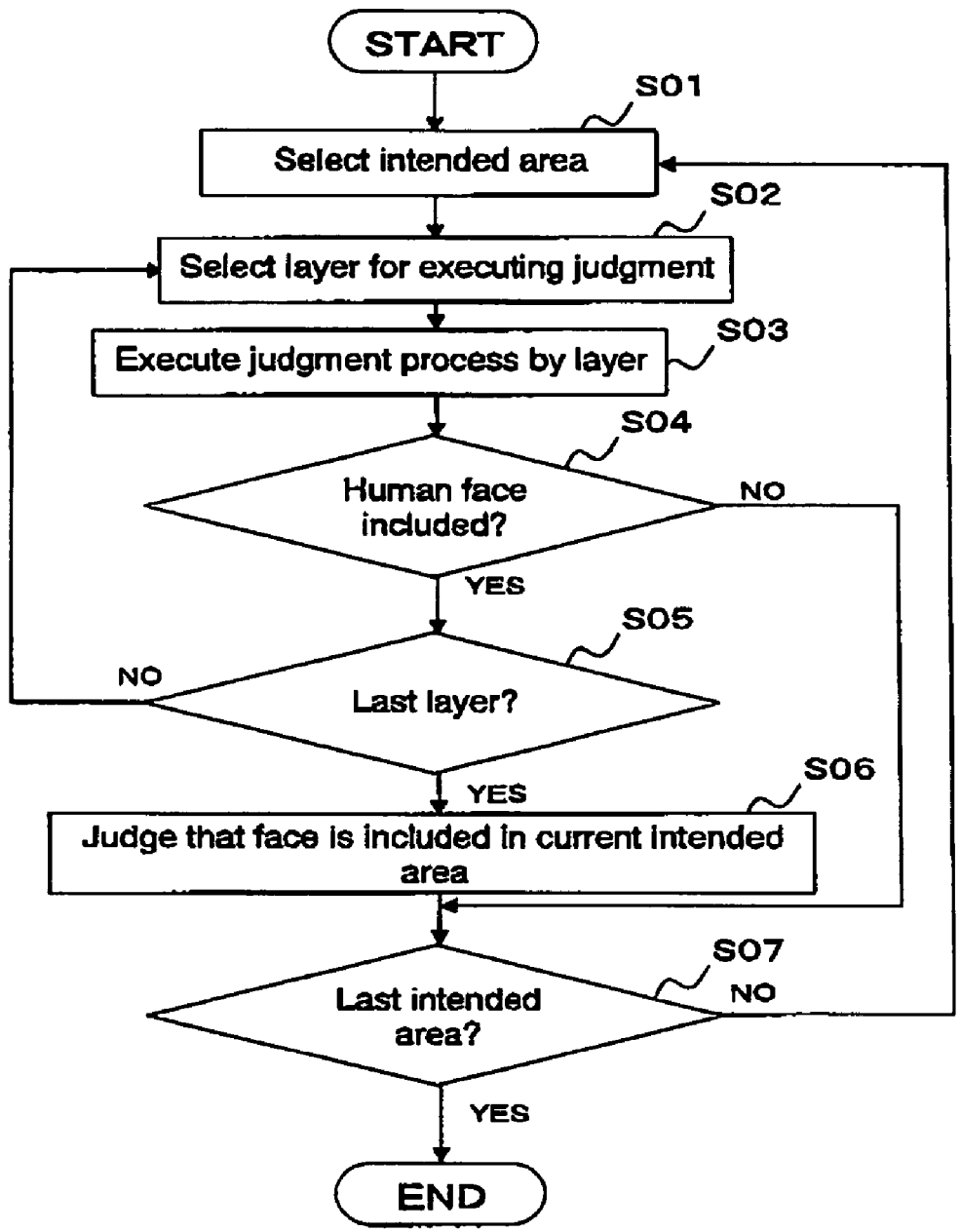
FIG. 3 shows a flowchart of the face detection process.

FIG. 3 is a flowchart showing the flow of the face detection process. A specific flow of the face detection process is explained with reference to FIG. 3.

Figure 4:
FIG. 4 shows a method of selecting an intended area with the size thereof fixed.

First in the face detection process, the intended areas to be processed are selected from the human image (S01). Basically, these intended areas are selected by shifting at predetermined intervals from an end of the human image vertically or horizontally. As an example, the intended areas are selected by raster scanning of the human image. In the process, a plurality of intended areas of different sizes are selected from an arbitrary human image. The selecting method includes a method in which the size of the human image is changed while fixing the size of the intended area or a method in which the size of the intended area is changed while fixing the size of the human image. FIG. 4 is a diagram showing the method in which the size of the intended area is fixed, and FIG. 5 is a diagram showing the method in which the size of the human image is fixed. With the change in the size of the intended area, the face rectangle 1, the first rectangle 2 and the second rectangle 3 also change in size. Specifically, the size of the face rectangle 1 used for each layer is controlled to the same or substantially the same size as the intended area which may change in size. Thus, the size of the first rectangle 1 and the second rectangle 2 change with the size of the face rectangle 1.

Next, it is judged whether a human face is included in the selected intended area. This judgment is executed for each of a plurality of layers. First, the layer on which the judgment is executed is selected in a predetermined order (S02).

Then, the judgment process is executed in the selected layer (S03). In the case where this layer judges that no human face is included in the intended area (NO in S04), the steps of and after S07 are executed. The steps of and after S07 are described in later. In the case where the judgment is that a human face is included in the intended area (YES in S04), on the other hand, it is judged whether the immediately preceding judgment (judgment in S03) is the process in the last layer or not. In the case where the last layer is not involved (NO in S05), the process returns to step S02 to select the next layer and the judgment is executed in the newly selected layer. In the case where the last layer is involved (YES in S05), on the other hand, it is finally judged that a human face is included in the current intended area (S06). At this time, the face detection device 4 judges that a human face is included in this intended area. In other words, it is not until this time point when a human face is detected by the face detection device 4.

Next, it is judged whether the intended area to be processed for judgment is the last one in the human image or not. In the case where it is not the last intended area (NO in S07), the process returns to step S01 where the next intended area is selected and the steps of and after S02 are executed. In the case where the last intended area is involved (YES, in S07), on the other hand, the face detection process for the particular human image is terminated.

Figure 6:
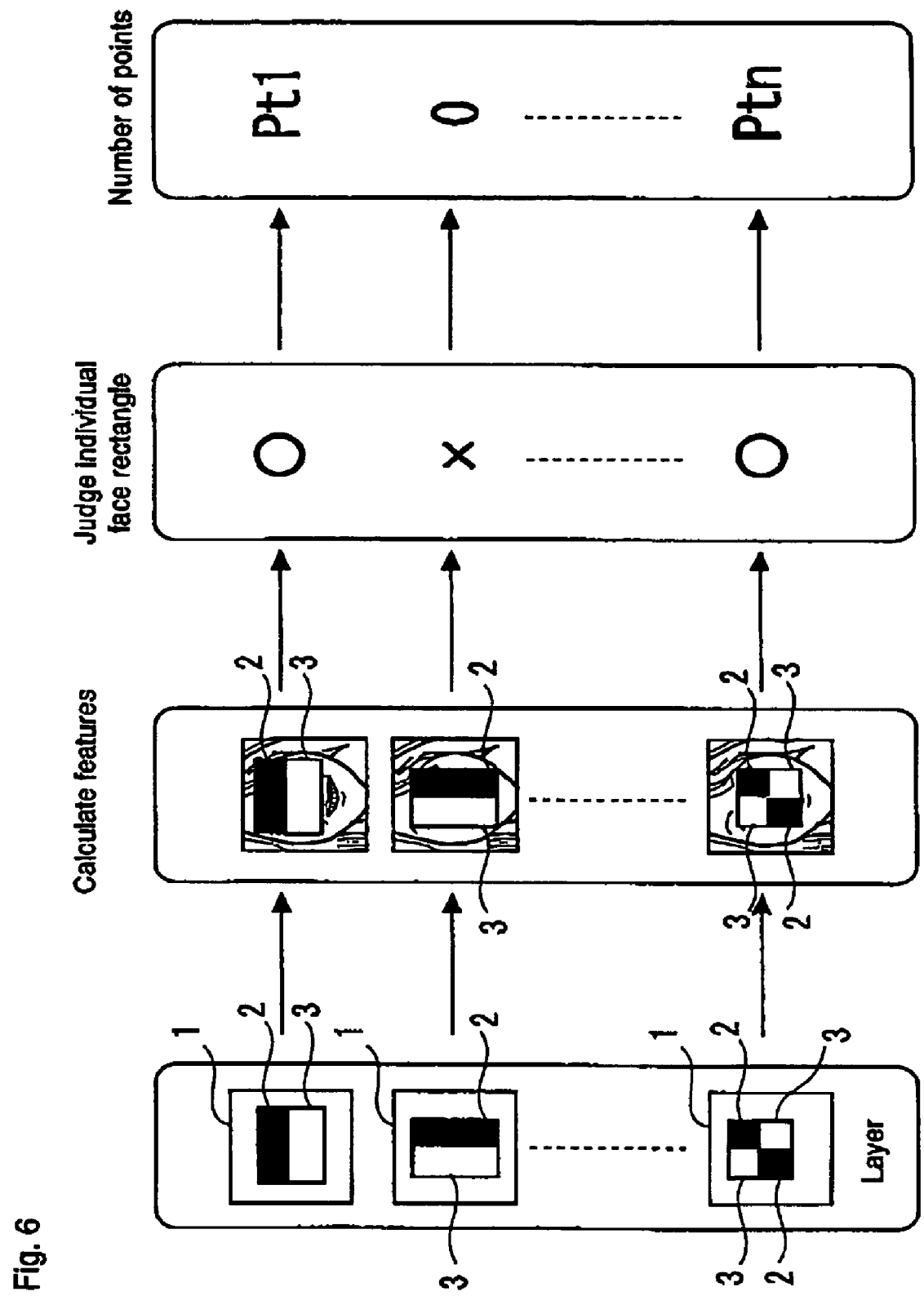
FIG. 6 shows an example of the process in each layer according to a first embodiment.

FIG. 6 is a diagram showing an example judgment process in each layer. With reference to FIG. 6, the layers and the judgment process in each layer are explained.

Each layer is assigned the face rectangle 1 of at least one pattern. This assignment is made by a boosting learning algorithm such as AdaBoost in the learning process. Based on the face rectangle 1 of the pattern assigned to itself, each layer judges whether a face is included or not in an intended area.

Figure 7:
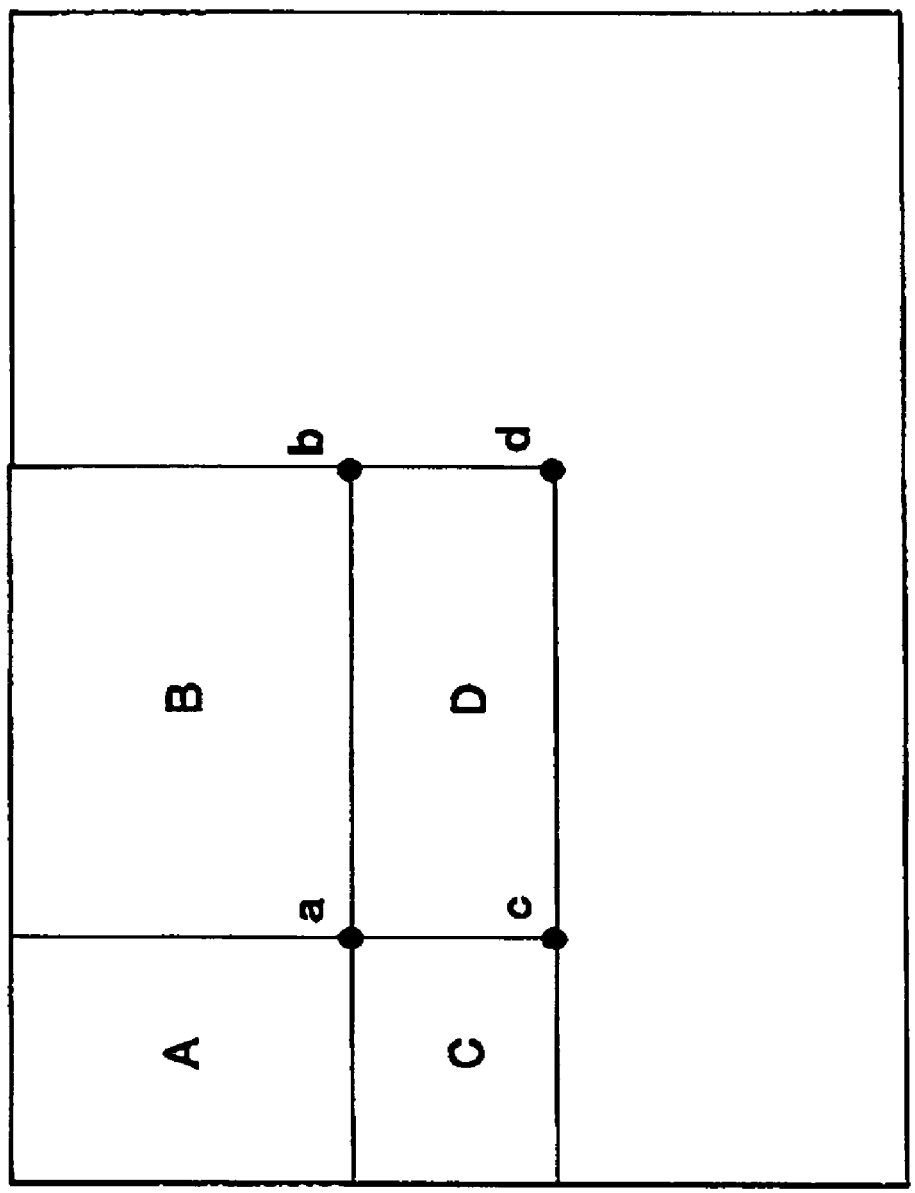
FIG. 7 shows an example of an integrated image.

In each layer, based on the face rectangle 1 of each pattern assigned to the particular layer, the features of the first feature area and the second feature area in the intended area are calculated. At the same time, in the case where the feature is the total or the average of the pixel values in each area, i.e. in the case where the feature is the value calculated using the total pixel value, the feature should be calculated using an integrated image. FIG. 7 is a diagram showing an example of an integrated image. With reference to FIG. 7, the process of calculating the feature using an integrated image is explained.

In an integrated image, each pixel has a pixel value equivalent to the total pixel value of all the pixels included in the upper left portion of the original image as viewed from the particular pixel. The pixel a in FIG. 7, for example, has a total pixel value of all the pixels included in the area A of the original image. As a result, the total pixel value of all the pixels included in the area D of the original image (i.e. the feature of the area D) is calculated by subtracting the pixel values b and c from the pixel value d and adding the pixel value a.

Then, a differential value is calculated as a relative value of the feature calculated, and based on this differential value, it is judged whether a human face is included in the intended area or not. Specifically, it is judged whether the calculated differential value is larger or smaller than the threshold value set for the face rectangle 1 of the pattern used for judgment. In accordance with the result of this judgment, the presence or absence of a human face in the intended area is determined.

The judgment by this time, however, is the judgment based on the face rectangle 1 of each pattern but not the judgment by a layer. In this way, the judgment is made in each layer individually based on the face rectangle 1 of all the patterns assigned thereby to obtain each judgment result (equivalent to "the individual judgment of the face rectangle" in FIG. 6).

Next, the number of points in a layer is calculated. The face rectangle 1 of each pattern is assigned an individual number of points (Pt1, Pt2, . . . , Ptn, for example). In the case where the judgment is that a human face is included in an intended area, the number of points assigned to the face rectangle 1 of the pattern used on that occasion is accessed and added to the number of points of the particular layer. The total number of points obtained in this way is calculated as the number of points for a layer (the total number of points in a layer is hereinafter referred to as "the total number of points" for distinction from the number of points for each pattern). In the case where the total number of points for a layer exceeds a specified threshold value, the layer judges that a human face is included in the intended area. In the case where the total number of points for the layer fails to exceed the specified threshold value, on the other hand, the layer judges that no human face is included in the intended area.

In steps S02 to S06 (FIG. 3), the judgment is made in the layers in the descending order of the processing ease (from the layer having a smallest number of assigned face rectangles 1, for example) (FIG. 2). As an alternative, before judgment in each layer, the distribution of brightness in the intended area is calculated, and based on the calculated value, it is judged whether the judgment for a particular layer is made or not. With this configuration, in the case where the judgment is that no judgment is made for each layer, the process of step S07 in FIG. 3 is executed. This is by reason of the fact that an intended area having substantially no brightness change (a deep black intended area or a pure white intended area, for example) is considered to contain no face without judgment for a layer.

First Embodiment

[Principle]

The conventional face detection technique used with the face detection device 4 is explained above. Next, an explanation is given about a modified process of the face detection technique used with the face detection device 4a according to a first embodiment of the invention. Specifically, the process not described below is executed the same way as the process of the face detection technique described above.

In the conventional face detection technique, a simple arithmetic model is assumed to calculate a threshold value for the face rectangle 1 of each pattern. An actual shape of the histogram of the differential value and the number of face image samples and non-face image samples, therefore, has not been assumed. In the case of the face rectangle 1 illustrated in the uppermost portion in FIG. 6, for example, the feature around the left and right eyes is calculated as a feature of the first feature area, while the feature around the nose and the left and right cheeks is calculated as a feature of the second feature area.

In the prior art, a threshold value is calculated on the assumption that the feature of these feature areas is distributed based on a simple arithmetic model. The above-mentioned specific example of the first feature area, however, is assumed to actually include three cases involving considerably different features, i.e. a case in which both the left and right eyes are closed, a case in which one of the eyes is closed, and a case in which both the left and right eyes are open. The above-mentioned specific example of the second feature area associated with the convex portions of the face such as the cheeks and the nose, on the other hand, is assumed to include two cases which are considered to involve considerably different features, according to whether the light reflection is conspicuous or not depending on the degree of convexity or the skin condition of the convex portions. In view of this, the face detection device 4a assumes that the differential value between the features of the two feature areas has no simple distribution such as the Gauss distribution but a distribution having a plurality of peaks.

Figure 8:
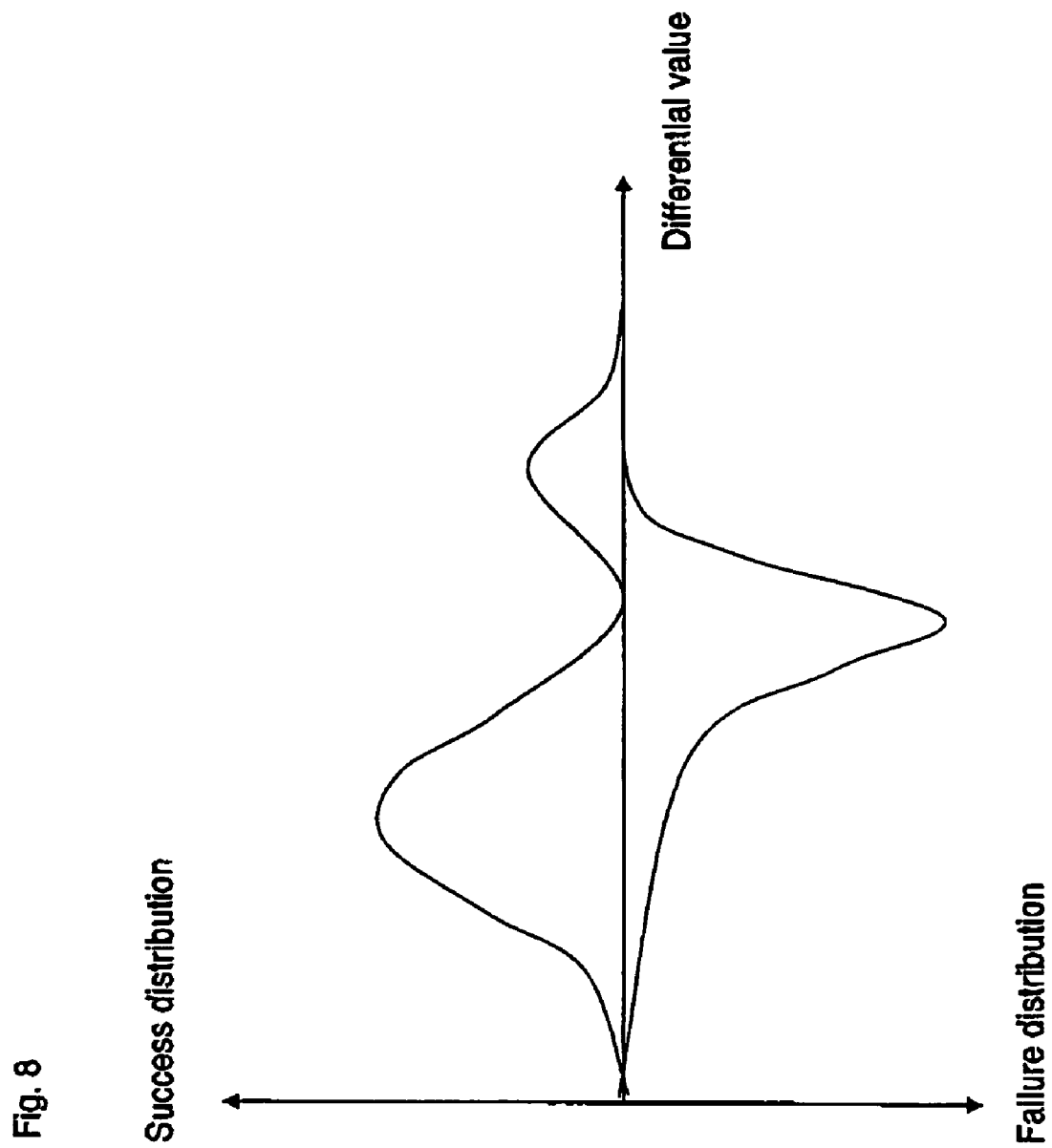
FIG. 8 shows an example of a histogram of the differential value versus the number of images.

FIG. 8 is a diagram showing an example of the histogram of the differential value calculated by collecting the data in the learning process. This histogram concerns the face rectangle 1 of a given pattern, and a similar histogram is formed for the face rectangle 1 of each pattern.

The abscissa of the histogram represents the differential value between the features of the first feature area and the second feature area. The ordinate of the histogram represents the number (frequency) of the sample images for which a corresponding differential value is calculated. The success distribution is defined as a distribution of the sample face images, and the failure distribution a distribution for the sample non-face images.

Figure 9:
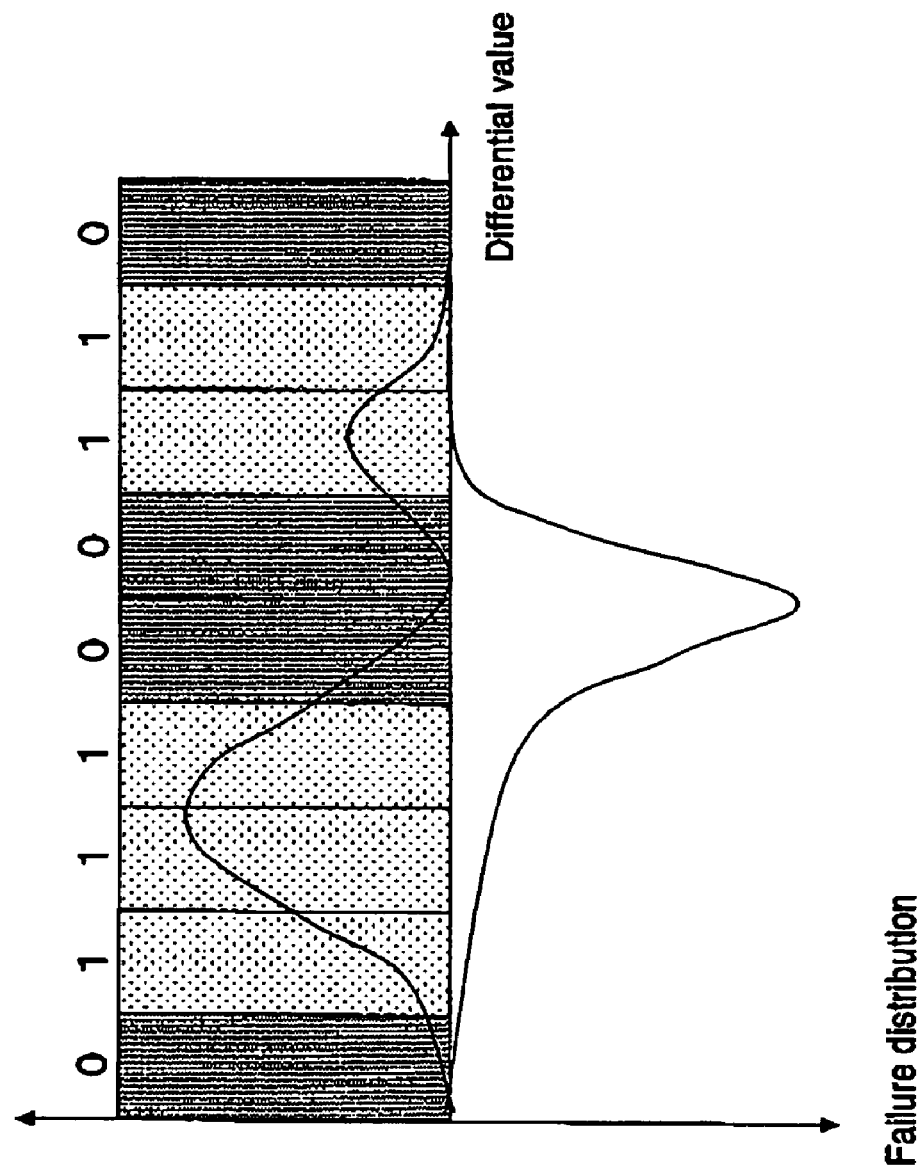
FIG. 9 shows an example of the judgment value applied to each section of the histogram according to the first embodiment.

Once a histogram is formed in the learning process according to the first embodiment, the abscissa is segmented at specified intervals. These intervals may have a predetermined width or a different width in accordance with the differential value. Next, based on the value of the success distribution (frequency of the face images) and the value of the failure distribution (frequency of the non-face images), a judgment value is determined for each section. FIG. 9 is a diagram showing the manner in which a judgment value for each section is determined based on the histogram thus formed. The judgment value is a value indicating whether the image distributed in the section of a corresponding differential value has a high probability of a face image or not. The judgment value assumes "1", for example, in the section having a high probability of a face image (the thin colored section in FIG. 9), and "0" in the section having a low probability of a face image (the thick colored section in FIG. 9). Also, the judgment value assumes "1" in the case where the frequency of the success distribution in a given section is higher than the frequency of the failure distribution in the same section, while it assumes "0" in the case where the frequency of the success distribution in a given section is lower than the frequency of the failure distribution in the same section.

Based on this histogram, a LUT (look-Up Table) 19a is produced. FIG. 10 is a diagram showing an example of the LUT 19a. The LUT 19a has a judgment value of the differential value corresponding to each section. In the face detection process after modification, the human face in the image is detected based on not the threshold value but the LUT 19a produced by the learning process in this way.

The process described above is executed for the face rectangles 1 of all the patterns prepared thereby to produce a LUT 19a corresponding to the face rectangle 1 of each pattern.

Next, it is judged which of a plurality of LUTs 19a is to be used in the face detection process. Specifically, which pattern of the face rectangle 1 is to be used to execute the face detection process is determined. In this judgment, each of a plurality of layers for detecting a face in the face detection process is assigned the face rectangle 1 of the pattern used for the particular pattern. This process is executed by the boosting learning algorithm such as AdaBoost.

In each layer of the face detection process of the face detection device 4a, the features of the first feature area and the second feature area in the intended area are calculated based on the face rectangle 1 of each pattern assigned to each layer. Next, the differential value of the calculated features is calculated, and based on this differential value, it is judged whether a human face is included or not in the intended area. Specifically, the judgment value corresponding to the calculated differential value is determined from the LUT 19a corresponding to the face rectangle 1 of each pattern, and the judgment is made by the value thus determined. In the judgment using the face rectangle 1 of the pattern corresponding to the LUT 19a shown in FIG. 10, for example, assume that the differential value is at least not less than 40 but less than 60, not less than 100 but less than 120 or not less than 140 but less than 160. Then, It is judged that no human face is included in the intended area. In the case where the differential value is at least not less than 60 but less than 100 or not less than 120 but less than 140, on the other hand, it is judged that a human face is included in the intended area.

As described above, the judgment process which is conventionally executed using a threshold value set on the assumption of a simple distribution is executed by the face detection device 4a using the LUT 19a set on the assumption of a distribution having a plurality of peaks.

[System Configuration]

(Face Detection Device)

Next, the configuration of the face detection device 4a using the face judgment technique altered as described above as compared with the prior art is explained. The face detection device 4a includes, in hardware, a CPU (central processing unit), a main storage unit (RAM) and an auxiliary storage unit connected through a bus. The auxiliary storage unit is configured of a nonvolatile memory. The nonvolatile memory indicates what is called a ROM (read-only memory, EPROM (erasable programmable read-only memory), EEPROM (electrically erasable programmable read-only memory), mask ROM, etc.), FRAM (ferroelectric RAM) or the like hard disk.

Figure 11:
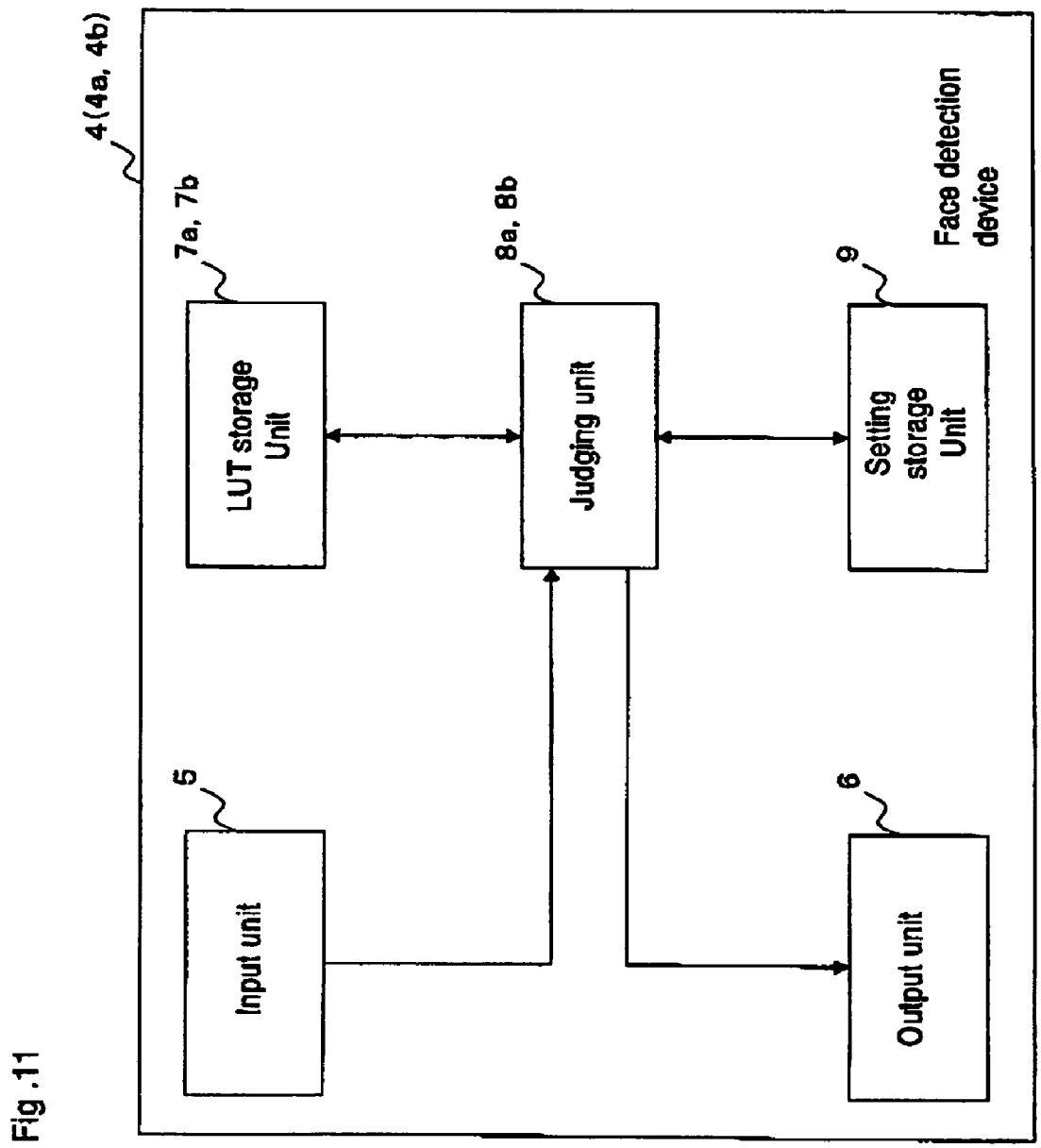
FIG. 11 shows a function block diagram of an example configuration of a face detection device.

FIG. 11 is a diagram showing the function blocks of the face detection device 4a. The face detection device 4a comprises an input unit 5, an output unit 6, a LUT storage unit 7a, a judgment unit 8a and a setting storage unit 9, in which the various programs (OS, application program, etc.) stored in the auxiliary storage unit are loaded on the main storage unit and executed by the CPU. With reference to FIG. 11, each function unit of the face detection device 4a is explained.

<<Input Unit>>

The input unit 5 functions as an interface for inputting the data on an original human image (hereinafter referred to as "the original image data") to the face detection device 4a. The original image data may be the data of a still image or the data of a dynamic image. The original image data is input to the face detection device 4a from outside the face detection device 4a by the input unit 5. The input unit 5 may be configured using any existing technique to input the original image data to the face detection device 4a.

The original image data may be input to the face detection device 4a through a network (local area network, internet, etc.). In this case, the input unit 5 is configured of a network interface. As an alternative, the original image data may be input to the face detection device 4a from a digital camera, a scanner, a personal computer or a recording device (such as a hard disk drive). In this case, the input unit 5 is configured in conformance with a standard (the standard for the wire connection such as USB (Universal Serial Bus) or SCSI (Small Computer System Interface) or the radio connection such as Bluetooth) which can establish communication between the face detection device 4a and the digital camera, the personal computer or the recording device. As another alternative, the original image data recorded in a recording medium (for example, any of various types of flash memory, floppy (registered trade mark) disk, CD (compact disk) or DVD (digital versatile disk, or digital video disk)) may be input to the face detection device 4a. In this case, the input unit 5 is configured of a device (such as the flash memory reader, the floppy disk drive, the CD drive or the DVD drive) for reading the data from the recording medium.

Also, the face detection device 4a may be included in an image pickup device such as a digital camera or any of various devices (for example, a PDA (personal digital assistant) having an image pickup device such as a digital camera or a portable telephone, so that a human image picked up may be input to the face detection device 4a as an original image data. In this case, the input unit 5 may be configured of a CCD (charge coupled device) or a CMOS (complementary metal-oxide semiconductor) sensor, or as an interface for inputting the original image data picked up by the CCD or the CMOS sensor to the face detection device 4a. As another alternative, the face detection device 4a may be included in an image output device such as a printer or a display so that a human image input to the image output device as an output data may be input to the face detection device 4a as an original image data. In this case, the input unit 5 is configured of a device for converting the original image data input to the image output device into a data that can be handled by the face detection device 4a.

Also, the input unit 5 may be so configured as to respond to a plurality of events.

<<Output unit>>

The output unit 6 functions as an interface whereby the data indicating whether a human face is detected by the judgment unit 8a and/or the data indicating the position and size of the detected face is output externally of the face detection device 4a. The output unit 6 may be configured using any existing technique for outputting the data on the human face detection result from the face detection device 4a.

The data on the detection result may be output from the face detection device 4a through a network, for example. In this case, the output unit 6 is configured of a network interface. Also, the data on the detection result may be output to another information processing system such as a personal computer or a recording unit. In this case, the output unit 6 is configured in conformance with the standard for connecting another information processing system such as a personal computer or a recording device and the face detection device 4a to each other in a communicable way. As another alternative, the data on the detection result may be output to (written in) a recording medium. In this case, the output unit 6 is configured of a device (such as a flash memory writer, a floppy disk drive, a CD-R drive or a DVD-R drive) for writing the data into the recording device or the recording medium, as the case may be.

A specific example of an application of the data output from the output unit 6 is explained. In order to output the pattern indicating the face area detected by the face detection device 4a to a display unit, for example, the data output from the output unit 6 may be used. In such a case, the output unit 6 may be configured either as an interface for data communication with the display unit or as an interface for delivering the data to an information processing system connected to or built in the display unit. As an alternative, in the case where the face detection device 4a is included in a digital camera or any of various devices having a digital camera, the digital camera may be configured to control the focal point or the image pickup operation including the exposure correction based on the data output from the output unit 6. In such a case, the output unit 6 may be configured as an interface capable of data communication with, for example, the information processing system in the digital camera. Also, in the case where the face detection device 4a is included in or connected to an information processing system for executing the image correcting process, the information processing system may be configured to determine the area and specifics of the image correcting process based on the data output from the output unit 6. In such a case, the output unit 6 may be configured as an interface capable of data communication with the particular information processing system or the device included therein.

Also, the output unit 6 may be configured to be capable of responding to a plurality of the events described above.

<<LUT Storage Unit>>

The LUT storage unit 7a is configured of a nonvolatile memory. The LUT storage unit 7a stores the LUT 19a used by the judging unit 8a to execute the face detection process. Specifically, the LUT storage unit 7a stores the LUT 19a for the face rectangle 1 of each pattern obtained as the result of the learning process. The LUT storage unit 7a, therefore, may be able to store a plurality of LUTs 19a.

<<Judging Unit>>

The judging unit 8a executes the face detection process based on the setting stored in the setting storage unit 9 using the LUT 19a stored in the LUT storage unit 7a. The judging unit 8a delivers the result of execution of the face detection process to the output unit 6. The judging unit 8a inputs the data to and outputs the data from the input unit 5, the output unit 6, the LUT storage unit 7a and the setting storage unit 9 through an input device and an output device not shown.

The judging unit 8a is realized by a CPU executing a face detection program. Also, the judging unit 8a may be configured as a dedicated chip.

Figure 12:
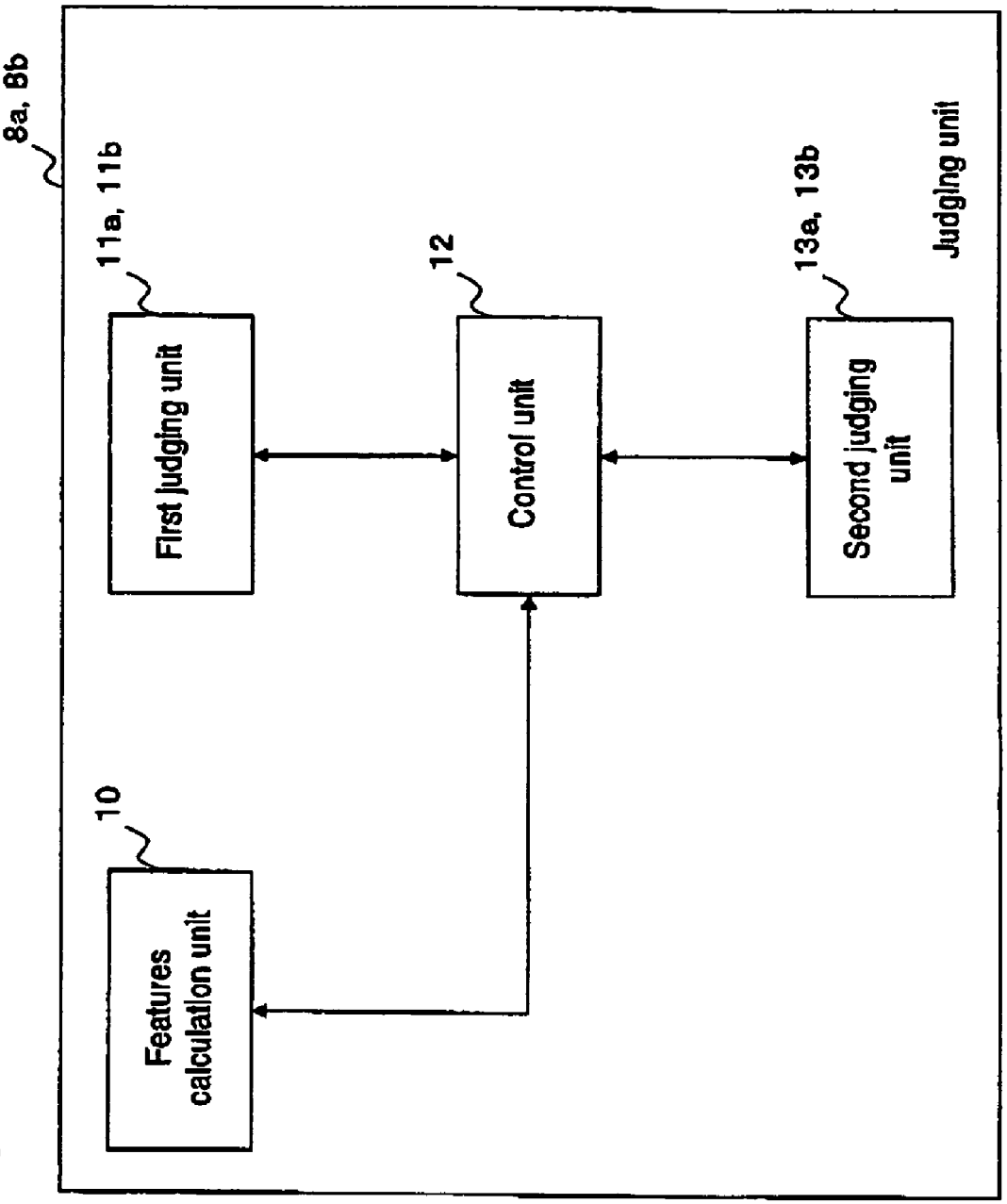
FIG. 12 shows a function block diagram of an example configuration of a judging unit.

FIG. 12 is a diagram showing the internal function blocks of the judging unit 8a. With reference to FIG. 12, the function blocks of the judging unit 8a are explained. The judging unit 8a includes a feature calculation unit 10, a first judging unit 11a, a control unit 12 and a second judging unit 13a.

The feature calculation unit 10 calculates the features of the first feature area and the second feature area in each layer. The feature calculation unit 10 calculates a relative value (a differential value in the case under consideration) of the two features thus calculated.

The first judging unit 11a acquires a judgment value corresponding to the differential value calculated by the feature calculation unit 10, and based on at least one judgment value, judges whether a human face is included in an intended area. Specifically, the first judging unit 11a reads the LUT 19a corresponding to the pattern used for calculation of the feature by the feature calculation unit 10. The first judging unit 11a, based on the LUT 19a thus read, acquires the judgment value corresponding to the differential value calculated by the feature calculation unit 10. The first judging unit 11a acquires the judgment values corresponding to all the patterns assigned to each layer, calculates the total number of points in each layer based on the judgment values and judges whether a human face is included in the intended area (S03 and S04 in FIG. 3).

The control unit 12 reads the various settings stored in the setting storage unit 9, and applies the position and size of the first rectangle 2 and the second rectangle 3 of each pattern to the feature calculation unit 10. Also, the control unit 12 applies each feature calculated by the feature calculation unit 10 and the LUT 19a corresponding to the pattern used for calculation of the particular feature to the first judging unit 11a. The control unit 12 also applies the judgment result of the first judging unit 11a to the second judging unit 13a. Further, the control unit 12 selects an intended area (S01 in FIG. 3) and controls the operation of the judging unit 8a (S02, S05 and S07 in FIG. 3).

The second judging unit 13a, based on the result produced by the first judging unit 11a, i.e. based on the judgment result in each layer, finally Judges whether the currently intended area includes a face or not (S06 in FIG. 3).

<<Setting Storage Unit>>

The setting storage unit 9 is configured of a nonvolatile memory. The setting storage unit 9 stores various settings used by the judging unit 8a to execute the face detection process. The setting storage unit 9 stores, for example, the face rectangle 1 of each pattern. Specifically, the position and size of the first rectangle 2 and the second rectangle 3 of each pattern are stored. Also, the setting storage unit 9 stores which pattern of the face rectangle 1 is assigned to each layer. Further, the setting storage unit 9 stores a method of selecting an intended area from within a human image.

(Table Generating Device)

Next, an explanation is given about the configuration of a table generating device 14a which generates the LUT 19a used by the face detection device 4a. The table generating device 14a includes, in terms of hardware, a CPU (central processing unit), a main storage unit (RAM) and an auxiliary storage unit connected to each other through a bus. The auxiliary storage unit is configured of a nonvolatile memory.

Figure 13:
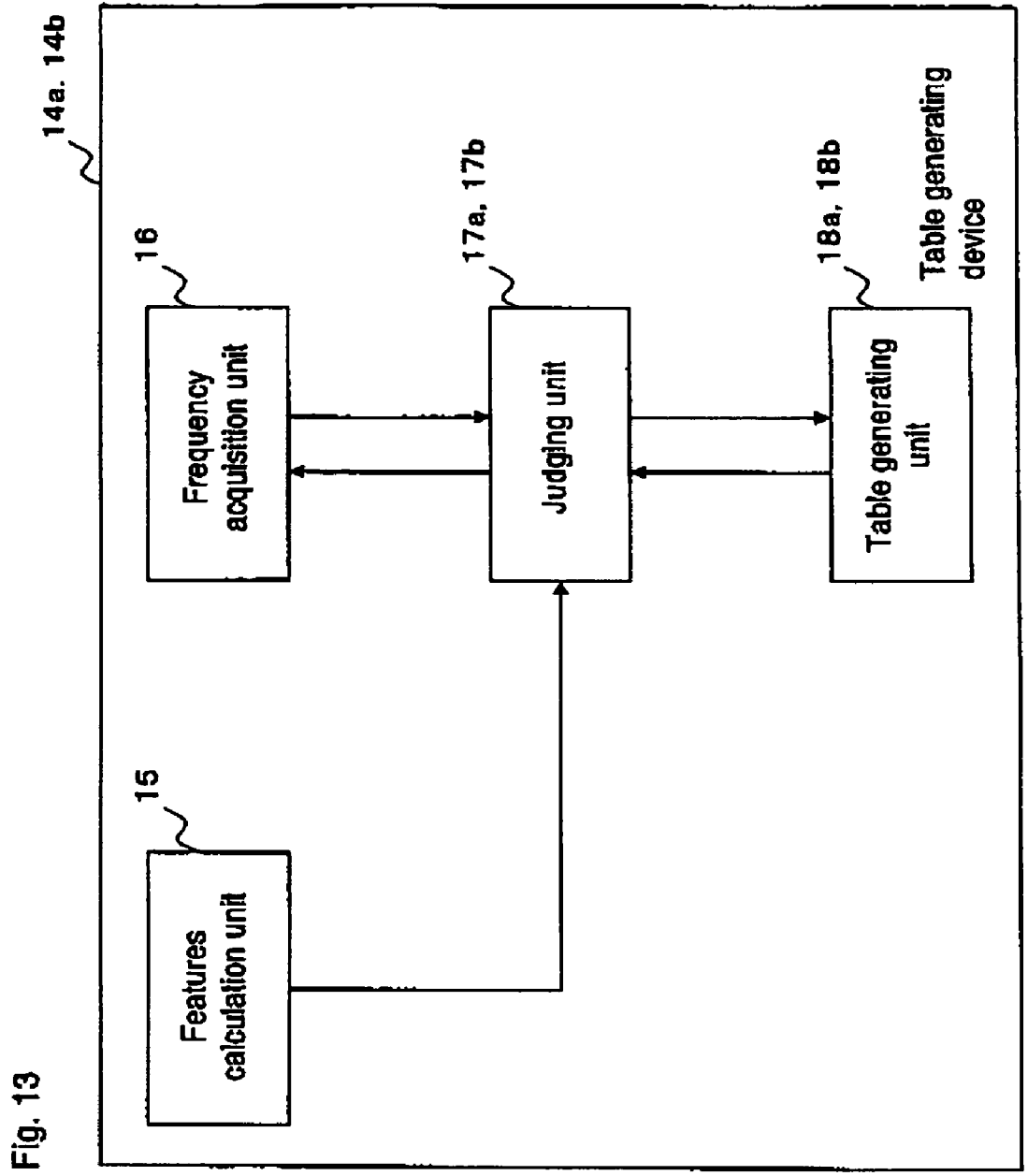
FIG. 13 shows a function block diagram of an example configuration of a table generating device.
Figure 14C:
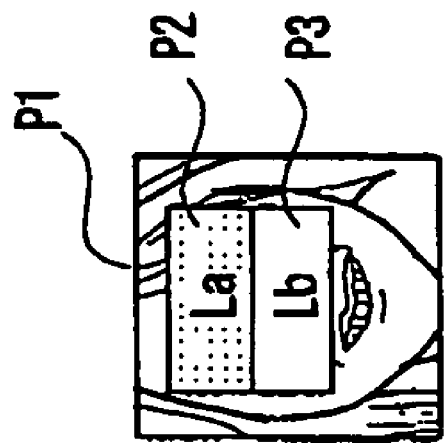
FIG. 14 shows an example of a face judging rectangle.
Figure 14B:
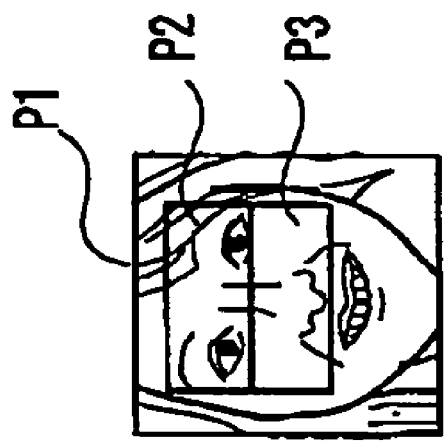
Figure 14A:
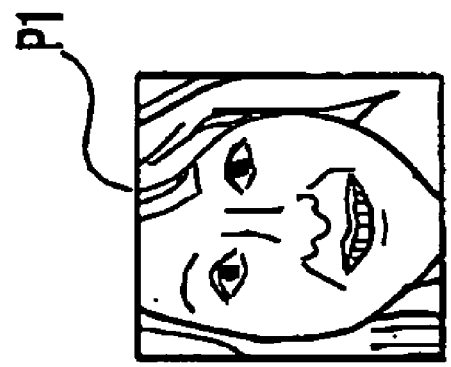

FIG. 13 is a diagram showing the function blocks of the table generating device 14a. The table generating device 14a includes a feature calculation unit 15, a frequency acquisition unit 16, a judging unit 17a and a table generating unit 18a, in which various programs (OS, application program, etc.) stored in the auxiliary storage unit are loaded onto the main storage unit and executed by the CPU.

The table generating unit 14a generally executes the learning process after a change. Now, each functional part of the table generating device 14a is explained with reference to FIG. 13.

The feature calculation unit 15 calculates the features of the first feature area and the second feature area in accordance with a pattern of each sample image. The feature calculation unit 15 calculates the differential value as a relative value of each feature. The features of each pattern (size, position, etc. of each feature area) may be stored either in the feature calculation unit 15 or in other functional parts not shown.

The frequency acquisition unit 16 acquires a success distribution and a failure distribution based on the result of calculation in the feature calculation unit 15. The frequency acquisition unit 16 acquires the frequency of each section of the success distribution and the failure distribution.

The judging unit 17a determines the judgment value of each section based on the frequency in each section of the success distribution and the failure distribution acquired by the frequency acquisition unit 16.

The table generating unit 18a generates the LUT 19a showing the correspondence between the judgment value determined by the judging unit 17a and the section thereof. Also, the table generating unit 18a judges which LUT 19a is to be used in the face detection device 4a, by executing the boosting learning algorithm, and assigns It to each layer.

[Operation/Effects]

With the face detection device 4a, the LUT 19a but not the threshold value is used to execute the judgment process in each layer of the face detection process based on the face rectangle 1 of each pattern. This LUT 19a holds in it the range of the differential value of the features in each feature area and the judgment value corresponding to each range of the differential value. Based on this judgment value, the judgment for each pattern is executed.

In the face detection device 4a, as compared with a case in which the presence or absence of a face in an intended area is judged based on a given threshold value, therefore, a more accurate judgment is made possible using the face rectangle 1 of each pattern. In the case where a histogram as shown in FIG. 9 is obtained by learning, for example, the prior art in which a simple distribution is assumed is such that the boundary between the fourth and fifth sections from the left side is set as a threshold value. Specifically, no specific consideration is given to the distribution having small peaks (the second and third sections from the right in FIG. 9). In the face detection device 4a, however, even the distribution having small peaks is also considered for judgment independently by use of the LUT 19a. As a result, the face detection device 4a using the face rectangle 1 of each pattern carries out individual judgments more accurately than in the prior art.

Also, in the face detection device 4a, the number of patterns of the face rectangle 1 assigned to each layer is reduced and/or the number of layers executed in the face detection process is reduced. Specifically, the total number of patterns of the face rectangle 1 on which judgment is carried out is reduced in the face detection process for one intended area.

The reason by which the judgment is made based on a plurality of patterns of the face rectangle 1 in the face detection process with the face detection technique used for the face detection device 4a is the fact that the judgment based on the face rectangle 1 of each pattern is very inaccurate. Specifically, the judgment on the individual basis should be inaccurate, and therefore the accuracy would be required to be improved by the judgment based on multiple patterns of the face rectangle 1. In the face detection device 4a, however, the accuracy of the judgment based on the individual pattern of the face rectangle 1 is improved. Therefore, the total number of patterns of the face rectangle 1 used for the face detection process for each intended area can be reduced, thereby making it possible to increase the processing speed without adversely affecting the overall accuracy of the face detection process.

[Modification]

The face detection device 4a for detecting a human face in an image is explained above taking a specified object detection apparatus as a specific example. Other specific examples of the specified object detection apparatus include a device for detecting the body of an automobile from an image, a device for detecting a specified animal such as a cat or a dog and a device for detecting a specified character, symbol or logo. These devices have a basic configuration similar to that of the face detection device 4a, the only difference being in the sample image used for the learning process. Also, in accordance with each specified object to be detected, the face detection device 4a may be appropriately altered.

Also, instead of the differential value between the features of the first feature area and the second feature area used in the foregoing case, a relative value such as the ratio of each feature may be used.

Second Embodiment

[Principle]

Next, the principle of the face detection technique applied to a face detection device 4b according to a second embodiment of the invention is explained. The description that follows deals with the difference from the face detection technique used in the first embodiment.

Figure 15:
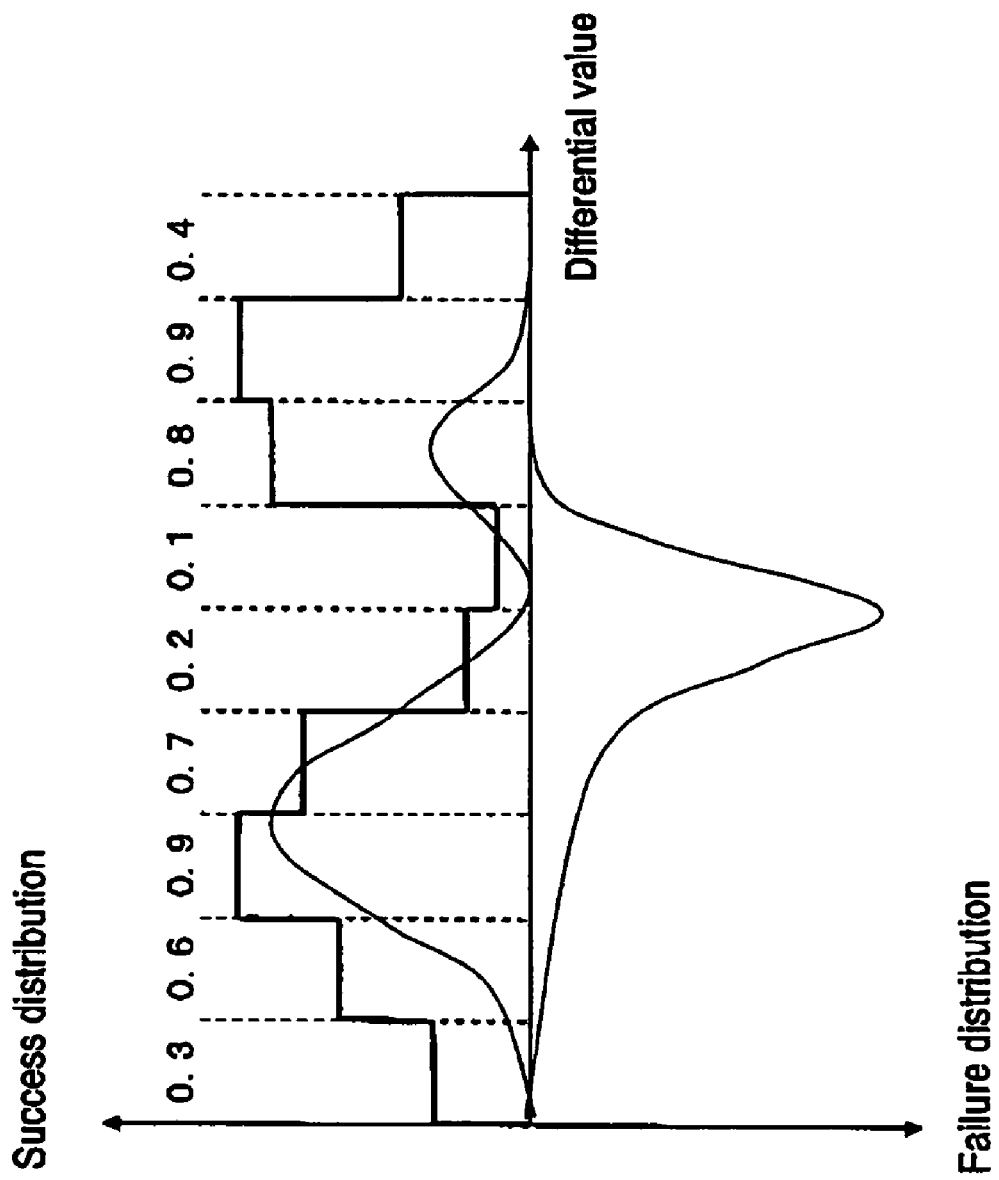
FIG. 15 shows an example of the judgment value applied to each section of the histogram according to a second embodiment.

According to the first embodiment, the abscissa of the histogram (FIG. 9) is segmented into sections at specified intervals, after which each section is assigned a judgment value of "0" or "1". According to the second embodiment, in contrast, each section is assigned a judgment value in real number. FIG. 15 is a diagram showing an example of the judgment value assigned to each section of the histogram according to the second embodiment. In the second embodiment, the judgment value indicates the degree of the probability or the very probability that the image distributed in the section of the corresponding differential value is a face image. Specifically, the judgment value in the first embodiment indicates "whether the possibility that the image in the intended area is a face is high or not", while the judgment value in the second embodiment indicates "the degree of possibility that the image in the intended area is a face". For example, the judgment value assumes a real number of "0" to "1". The higher this value, the higher the probability that the image in the intended area is a face image. More specifically, the judgment value may be, calculated based on Equation 1 below. In Equation 1 below, the judgment value is calculated as h(x).

$$\text{If } f_{Haar}(x) \in bin_j \text{ then } h(x) = \frac{1}{2}\ln\left(\frac{\overline{W}^j_{+1}+\varepsilon}{\overline{W}^j_{-1}+\varepsilon}\right) \text{ where} \quad (1)$$

$$\overline{W}^j_l = P(f_{Haar}(x) \in bin_j, y = l), l = \pm 1, j = 1, \ldots, n.$$

$$bin_j = \left[\frac{j-1}{n}, \frac{j}{n}\right), j = 1, \ldots, n$$

$f_{Haar}$ is the Haar feature

Also, this judgment value may be determined based on the difference or the ratio between the frequency of the success distribution and the frequency of the failure distribution. In this case, the higher the frequency of the success distribution with respect to the frequency of the failure distribution, the larger the judgment value, and vice versa.

The LUT 29b is produced based on the judgment value in each section of this histogram. FIG. 16 is a diagram showing an example of the LUT 19b. The LUT 19b has a judgment value corresponding to each section of the differential value which is expressed as a real number. According to the second embodiment, like the LUT 19a in the first embodiment, the LUT 19b is produced which corresponds to each of the face rectangles 1 of all the patterns. According to the boosting learning algorithm, the LUT 19b is assigned to each of a plurality of layers.

Figure 17:
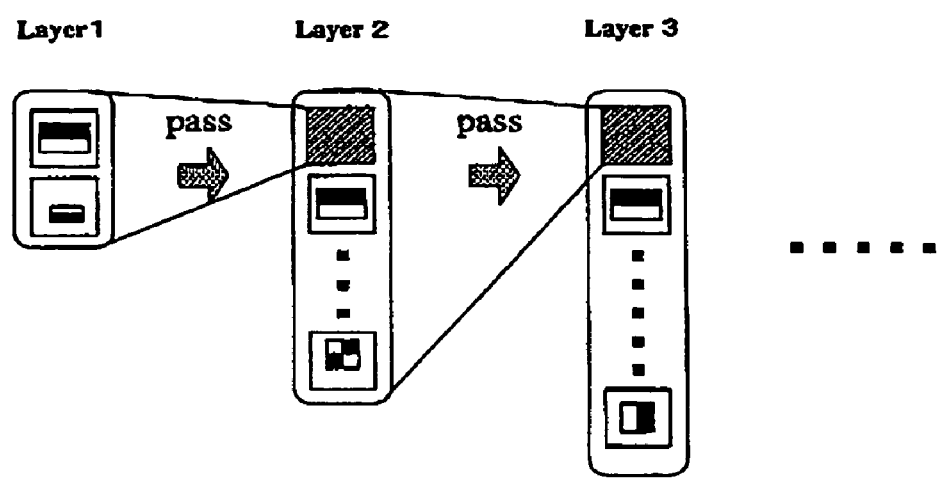
FIG. 17 shows an outline of the process in each layer according to the second embodiment.

In the face detection process according to the second embodiment, each layer (except for the layer to execute the first process) executes a different process from the corresponding layer in the first embodiment. FIG. 17 is a diagram showing the outline of the process executed in each layer according to the second embodiment. The first layer (Layer 1), like each layer in the first embodiment, acquires the judgment value of each pattern assigned to the particular layer. The layer 1 calculates the total number of points of the layer based on the judgment value of each pattern and judges whether a face exists or not in the intended area. In each of the layers including and subsequent to the layer 2, on the other hand, the presence or absence of a face in the intended area is judged based on the judgment value obtained from the face rectangle 1 of each pattern assigned to the particular layer and the total number of points calculated in the immediately preceding layer. Specifically, according to the second embodiment, each layer is different from the corresponding layer in the first embodiment in that in the second embodiment, the total number of points for a given layer is calculated taking into account the total number of points for the immediately preceding layer. Each layer in the second embodiment regards the judgment value of each pattern as the number of points of the particular pattern. Nevertheless, a configuration can alternatively be employed in which another value obtained from the judgment value of each pattern is treated as the number of points of the particular pattern.

FIG. 18 is a diagram showing a specific example of the process executed in each layer according to the second embodiment. The layer m (which is not the first layer to execute the process) calculates the feature based on each pattern assigned to the layer m. Then, the layer m acquires the judgment values (pt2 to ptn) based on the LUT 19b and the feature calculated for each pattern. Further, the layer m acquires the total number of points in the immediately preceding layer (layer m−1) with the judgment value pt1.

According to the first embodiment, the total number of points in each layer is calculated taking into consideration only the number of points of the patterns having the judgment value of "1". According to the second embodiment, on the other hand, each layer calculates the total number of points taking the judgment values in real number of all the patterns. Thus, the layer m calculates the total number of points based on all the judgment values (pt1 to ptn) and thus executes the judgment as layer m. The layer m, upon judgment that a face is included in the intended area, delivers the total number of points in the layer m to the next layer (layer m+1). In the last layer, it is judged finally whether a face exists or not in the intended area.

[System Configuration]

<Face Detection Device>

The configuration of the face detection device $4b$ according to the second embodiment is explained. The face detection device $4b$ is different from the face detection device $4a$ in that the face detection device $4b$ includes a LUT storage unit $7b$ and a judging unit $8b$ in place of the LUT storage unit $7a$ and the judging unit $8a$, respectively. The difference of the face detection device $4b$ from the face detection device $4a$ is explained below.

<<LUT Storage Unit>>

The LUT storage unit $7b$ is different from the LUT storage unit $7a$ in that the LUT storage unit $7b$ stores the LUT $19b$ (FIG. 16) in place of the LUT $19a$ (FIG. 10). In other points, the LUT storage unit $7b$ has a similar configuration to the LUT storage unit $7a$.

<<Judging Unit>>

The judging unit $8b$ executes the face detection process based on the setting stored in the setting storage unit 9 using the LUT $19b$ stored in the LUT storage unit $7b$. Now, the function blocks of the judging unit $8b$ are explained with reference to FIG. 12. The judging unit $8b$ is different from the judging unit $8a$ in that the first judging unit $11a$ is replaced by the first judging unit $11b$ and the second judging unit $13a$ is replaced by the second judging unit $13b$. The difference of the judging unit $8b$ from the judging unit $8a$ is explained below.

The first judging unit $11b$ acquires the judgment value corresponding to the differential value calculated by the feature calculation unit 10, and based on at least one judgment value, judges whether a human face is included in the intended area or not. Specifically, the first judging unit $11b$ reads the LUT $19b$ corresponding to the pattern used for calculation of the feature by the feature calculation unit 10. The first judging unit $11b$, based on the LUT $19b$ thus read, acquires the judgment value in real number corresponding to the differential value calculated by the feature calculation unit 10, i.e. the judgment value for each pattern. The first judging unit $11b$, based on these judgment values, calculates the total number of points for each layer and judges whether a human face is included in the intended area or not.

In the second and subsequent layers, the first judging unit $11b$ uses a value based on the total number of points in the immediately preceding layer as one of the judgment values. Specifically, in each of the second and subsequent layers, the first judging unit $11b$ calculates the total number of points for the particular layer using the value based on the total number of points in the immediately preceding layer and all the judgment values corresponding to the patterns assigned to the particular layer. In accordance with the total number of points thus calculated, the first judging unit $11b$ judges, for the particular layer, whether a face is included or not in the currently intended object.

The second judging unit $13b$, based on the result of the process executed in the first judging unit $11b$, i.e. based on the judgment result in each layer, finally judges whether a face is included or not in the currently intended area (S06 in FIG. 3).

<Table Generating Device>

Next, the configuration of the table generating device $14b$ for generating the LUT $19b$ used by the face detection device $4b$ is explained. The table generating device $14b$ is different from the table generating device $14a$ in that the table generating device $14b$ executes the learning process according to the second embodiment. Specifically, the table generating device $14b$ is different from the table generating device $4a$ in that the judging unit $17a$ and the table generating unit $18a$ are replaced with the judging unit $17b$ and the table generating unit $18b$, respectively. Only the difference of the table generating device $14b$ from the table generating device $14a$ is described below.

Based on the frequency of each section in the success distribution and the failure distribution acquired by the frequency acquisition unit 16, the judging unit $17b$ calculates the judgment value in real number of each section in accordance with Equation 1.

The table generating unit $18b$ generates the LUT $19b$ containing the judgment values in real number calculated by the judging unit $17b$ and the corresponding sections. Also, the table generating unit $18b$ judges which LUT $19b$ is to be used for the face detection device $4b$ by executing the boosting learning algorithm, and assigns the LUT $19b$ thus selected to each layer

[Operation/Effects]

With the face detection device $4b$ according to the second embodiment, in the judging process in each layer of the face detection process, the judgment based on the face rectangle 1 of each pattern uses the LUT $19b$ (FIG. 16) but not the LUT $19a$. The LUT $19b$ holds therein the values of "0" to "1" in real number but not the binary digit "0" or "1" as a judgment value corresponding to each range of the differential value.

In the face detection device $4b$, therefore, the accuracy of the process for each layer is improved as compared with the face detection device $4a$ for executing the process using the LUT $19a$. In the LUT $19a$, a case in which there is substantially no frequency difference between the success distribution and the failure distribution and the judgment value is determined as "0" with a slight margin (hereinafter called the case 1) is handled exactly the same way as a case in which the frequency of the failure distribution is apparently overwhelmingly large and the judgment value is determined as "0" (hereinafter called the case 2). In the LUT $19b$, on the other hand, the judgment value is determined as, for example, "0.4" in the case 1 and "0.1" in the case 2, which are considered differently. Therefore, the case 1 frequent and the case 2 frequent can be considered as different situations (different numbers of points), thereby contributing to an improved accuracy of face detection.

As described above, the judgment value of each pattern is expressed in real number for an improved accuracy, and therefore the number of patterns assigned to each layer is reduced while at the same time maintaining the processing accuracy. Specifically, the judging process can be executed with a fewer number of patterns than in the prior art. As a result, the processing speed is improved. For the same reason, the number of layers is reduced for an improved processing speed.

Also, in the face detection device $4b$ according to the second embodiment, the number of points in a layer for which the judging process has been completed is used in a layer for which the judging process has yet to be completed thereby to execute the judging process in the latter layer. In other words, the judgment value of each pattern in a layer for which the judging process is already completed is reflected in the judging process executed in subsequent layers. In subsequent layers, therefore, the number of patterns affecting the judging process is virtually increased as compared with the number of patterns actually used. As compared with the face detection device 4a which executes no such process, therefore, the accuracy of the judging process for each layer can be improved. In the subsequent layers, therefore, the number of patterns assigned to each layer can be reduced and a higher processing speed can be realized while at the same time maintaining the accuracy of the judging process. Similarly, the number of layers can be reduced to realize a high processing speed. Also, a reduced number of patterns can reduce the number of resources used in the face detection device 4b.

[Modification]

In the case of the histogram shown in FIG. 15 and the LUT 19b illustrated in FIG. 16, the judgment value is expressed in a fraction down to the first decimal place with one significant digit. Nevertheless, the judgment value is not necessarily expressed in this way. Specifically, the designer can freely determine to his/her convenience the significant number of digits and the decimal place down to which the judgment value should be expressed.

The second judging unit 13b may be configured to calculate the total number of points in each layer not using all the judgment values corresponding to each pattern assigned to the particular layer but using only the judgment values exceeding a threshold value ("0.2" or "0.5", for example) of all the judgment values corresponding to each pattern assigned to the particular layer.

The second judging unit 13b may be also so configured as to calculate the total number of points in each layer not using the total number of points in the immediately preceding layer but using a value based on the total number of points in one or more layers for which the judgment process is executed before the immediately preceding layer.

Also, the second Judging unit 13b, in obtaining a judgment value using the total number of points in one or more layers for which the judging process is previously processed, may either use the total number of points directly as a judgment value or add some weight to the total number of points.

What is claimed is:

1. A specified object detection apparatus comprising:
a storage unit for storing each judgment value prepared in accordance with each of a plurality of rectangle patterns, a judgment value representing the possibility that the specified object is included in an intended area;
a calculation unit comprising a plurality of layers, each layer for calculating features of different patterns in a same intended area from an image by calculation processes corresponding respectively to each pattern; and
a first judging unit for outputting a judgment result whether a specified object is included in the intended area based on the judgment values stored in the storage unit and corresponding to the features calculated by the calculation unit; and,
a control unit for applying to the first judging unit a plurality of patterns as a set obtained though a plurality of different calculation processes executed each by a layer of the calculation unit thereby to acquire the judgment results in a number sufficient to obtain a final judgment from the first judging unit; and
a second judging unit for finally judging whether a specified object is included in the intended area, based on a plurality of results of the judgment made by the first judging unit and acquired by the control unit, wherein the storage unit stores further a number of points assigned to each rectangle pattern, the first judging unit calculates further a total number of points for each layer based on the judgment values stored in the storage unit and corresponding to the features calculated by the calculation unit, said total number of points being based on the number of points assigned to each pattern of the layer for which the judgment is whether the specified object is included in the intended area, the judgment result of the layer representing whether a specified object is included in the intended area being based on this total number of points, the first judging unit provides the plurality of the results of the judgments of whether a specified object is included in the intended area and a judgment from each layer is made referring to the result of a preceding judgment from the immediately preceding layer.

2. The specified object detection apparatus for detecting a specified object in an image according to claim 1, wherein the storage unit storing further learning data in the form of look up tables.

3. The specified object detection apparatus according to claim 2, wherein
the calculation unit is for calculating differential values between the features values of a first feature area and of a second feature for a second and for additional patterns of the same intended area,
the first judging unit calculates a number of points based on the judgment real values of the look up tables stored in the storage unit and corresponding to the features calculated by the calculation unit, and based on the number of points, judging whether a specified object is included in the intended area,
the control unit for applying to the first judging unit a plurality of features as a set obtained through a plurality of different calculation processes executed by the calculation unit thereby to acquire the judgment results in a number sufficient to obtain a final judgment from the first judging unit; and
the second judging unit for finally judging whether a specified object is included in the intended area, based on a plurality of results of the judgment made by the first judging unit and acquired by the control unit.

4. The specified object detection apparatus for detecting a specified object in an image according to claim 3, further comprising:
an input unit for inputting data of the image;
a setting storage unit for storing various settings data about the intended areas and about the patterns included in each intended area, the judging unit receiving data about the image from the input unit; and
an output unit receiving at least one of data from the judging unit for indicating whether a specified object is detected by the judgment unit and the data indicating the position and size of the detected specified object.

5. The specified object detection apparatus for detecting a specified object in an image according to claim 2, further comprising:
an input unit for inputting data of the image;
a setting storage unit for storing various settings data about the intended areas and about the patterns included in each intended area, the judging unit receiving data about the image from the input unit; and
an output unit receiving at least one of data from the judging unit for indicating whether a specified object is detected by the judgment unit and the data indicating the position and size of the detected specified object.

6. The specified object detection apparatus according to claim 5, wherein said feature calculation unit includes several layers, each layer calculating the features of a first feature area and of a second feature area of a particular pattern assigned to said particular layer, and a relative value thereof, and wherein the setting storage unit stores further which particular pattern is assigned to a particular layer of the feature calculation unit, and by the control unit resulting settings stored in the setting storage unit, indicating to the feature calculation unit the position and size of the first feature area and of the second feature area of a particular pattern, and also the look up table obtained by using the same particular pattern and to be used for judging, and transmitting the judgment to the second judging unit, wherein the first judging unit acquiring a judgment value on whether a specified object is included in the intended area, based on the relative value calculated by the feature calculation unit, and on the look up table indicated by the control unit for said pattern, and wherein the second judging unit judging whether a specified object is included in the intended area based on the judgment result in each layer.

7. A method for detection of a specified object in an intended area of an image, the method comprising:
   a) preparing judgment values and storing them, each judgment value corresponding to each of a plurality of rectangle patterns representing the possibility that the specified object is included in an intended area;
   b) calculating in a calculation unit comprising a plurality of layer, features of different patterns in a same intended area from an image by calculation processes corresponding respectively to each pattern;
   c) judging whether the specified object is included or not in the intended area based on the stored judgment values and corresponding to the features calculated at step b);
   d) repeating steps b) and c) using a plurality of patterns as a set obtained through a plurality of different calculation processes executed each by a layer of the calculation unit thereby to acquire the judgment results in the number sufficient to obtain a final judgment and storing the judgments thus obtained each time;
   e) finally judging whether a specified object is included in the intended area, based on a plurality of results of the judgment made and stored at step d), wherein
   a number of points is assigned to each rectangle pattern and stored,
   in step c) it is calculated further a total number of points for each layer, said total number of points being based on the number of points assigned to each pattern of the layer for which the judgment is that the specified object is included in the intended area, and
   in step d) making of the judgment result of the layer whether a specified object is included in the intended area is based further on the total number of points of the layer, and the judgment of each layer is made referring to the result of a preceding judgment from the immediately preceding layer.

8. The method for detection of a specified object in an image according to claim 7, further comprising;
   repeating steps b), c), d), and e) each time for a different intended area of the image and judging whether the specific object is included in the image according to the results obtained in the different intended areas of the image.

9. The method for detection of a specified object in an intended area of an image according to claim 7, wherein in step a) the prepared and stored judgment are in the form of a look up table provided by a method comprising:
   aa) submitting a set of sample object images and non sample object images;
   ab) computing a differential value between the features values of a first feature area and of a second feature area, for a first pattern of an intended area and further comprises;
   ac) drafting a curve having for said first pattern, in abscissa computed relative values and in positive ordinate a frequency at which, each differential value is appearing for the object image, the curve having positive ordinate being a success distribution curve, and in negative ordinate a frequency at which, each value is appearing for the non object image, the curve in negative ordinate being a failure distribution curve;
   ad) segmenting the abscissa at different specified intervals;
   ae) determining for each interval a positive judgment value for the intervals having a high probability of being an object image, in said intervals the frequency of success is higher than the frequency of failure, and a negative judgment value for the intervals having a low probability of being an object image, in said intervals the frequency of success is lower than the frequency of failures;
   af) building a look up table in which positive or negative judgment are made for each specified interval of the abscissa; and
   storing said look up table.

10. The method for detection of a specified object in an intended area of an image according to claim 9, wherein
    steps a) to e) for said set of sample object image and non sample object image is made again (n-1) times each time being with a second, a third and up to a nth pattern to produce a look up table for each of the (n-1) patterns.

11. The method for detection of a specified object in an intended area of an image according to claim 10, wherein the positive judgment value is 1 and the negative judgment value is 0.

12. The method for detection of a specified object in an intended area of an image according to claim 9, wherein the positive judgment value is 1 and the negative judgment value is 0.

13. The method for detection of a specified object in an intended area of an image according to claim 9, wherein the positive judgment value is a real value corresponding to the frequency of success and the negative judgment value is a frequency corresponding to the frequency of failure.

14. The method for detection of a specified object in an intended area of an image according to claim 10, wherein the positive judgment value is a real value corresponding to the frequency of success and the negative judgment value is a frequency corresponding to the frequency of failure.

* * * * *